US012049028B1

(12) United States Patent
Tan et al.

(10) Patent No.: US 12,049,028 B1
(45) Date of Patent: *Jul. 30, 2024

(54) SHAPE-MEMORY POLYIMIDE NANOCOMPOSITES AND FABRICATION OF SAME

(71) Applicant: Government of the United States, as represented by the Secretary of the Air Force, Wright-Patterson AFB, OH (US)

(72) Inventors: Loon-Seng Tan, Centerville, OH (US); David H. Wang, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,845

(22) Filed: Jan. 11, 2023

Related U.S. Application Data

(63) Continuation of application No. 16/752,787, filed on Jan. 27, 2020, now Pat. No. 11,613,051.

(60) Provisional application No. 62/908,196, filed on Sep. 30, 2019.

(51) Int. Cl.
| | |
|---|---|
| *C08G 73/10* | (2006.01) |
| *B29C 41/00* | (2006.01) |
| *B29C 41/46* | (2006.01) |
| *C08G 73/14* | (2006.01) |
| *C08K 3/04* | (2006.01) |
| *C08L 79/08* | (2006.01) |
| *B29K 79/00* | (2006.01) |
| *B29K 105/24* | (2006.01) |
| *B82Y 30/00* | (2011.01) |

(52) U.S. Cl.
CPC .......... *B29C 41/003* (2013.01); *B29C 41/46* (2013.01); *C08G 73/1007* (2013.01); *C08G 73/1067* (2013.01); *C08G 73/14* (2013.01); *C08K 3/041* (2017.05); *C08K 3/042* (2017.05); *C08L 79/08* (2013.01); *B29C 2791/001* (2013.01); *B29K 2079/085* (2013.01); *B29K 2105/246* (2013.01); *B82Y 30/00* (2013.01); *C08K 2201/011* (2013.01); *C08L 2201/12* (2013.01); *C08L 2312/00* (2013.01)

(58) Field of Classification Search
CPC .. C08L 2201/12; C08L 2312/00; C08L 79/08; C08G 2261/135; C08G 73/10; C08G 73/14; C08G 73/1007; B29C 41/003; B29C 41/46; C08K 3/041
See application file for complete search history.

(56) References Cited

U.S. PATENT DOCUMENTS

| | | |
|---|---|---|
| 8,546,614 B1 | 10/2013 | Tan et al. |
| 8,668,981 B2 | 3/2014 | Karst et al. |
| 8,791,227 B1 | 7/2014 | Tan et al. |
| 8,962,890 B1 | 2/2015 | Tan et al. |
| 10,239,254 B1 | 3/2019 | Tan et al. |
| 10,294,255 B1 * | 5/2019 | Tan ........................ C08G 73/14 |
| 2015/0284498 A1 | 10/2015 | Weiss et al. |
| 2016/0369055 A1 | 12/2016 | Leng et al. |
| 2019/0300792 A1 | 10/2019 | Guin et al. |

OTHER PUBLICATIONS

Qin et al Helicity and packing of single-walled carbon nanotubes studied by electron nanodiffraction, Chemical Physics Letters 268 (1997) 101-106, published on Apr. 1997.*
Koerner, Hilmar; Strong, Robert J.; Smith, Matthew L.; Wang, David H.; Tan, Loon-Seng; Lee, Kyung Min; White, Timothy J.; Vaia, Richard A.; Polymer design for high temperature shape memory: Low crosslink density polyimides, Polymer 2013, 54 (1), 391-402.
Yoonessi, M.; Shi, Y.; Scheiman, D. A.; Lebron-Colon, M.; Tigelaar, D. M.; Weiss, R. A.; Meador, M. A.; Graphene Polyimide Nanocomposites; Thermal, Mechanical, and High-Temperature Shape Memory Effects. ACS Nano 2012, 6, 7644-7655.
Shi, Ying; Yoonessi, Mitra; Weiss, R. A.; High Temperature Shape Memory Polymers, Macromolecules, 2013, 46(10), 4160-4167.
Wang, Qihua; Bai, Yongkang; Chen, Yu; Ju, Junping; Zheng, Fei; Wang, Tingmei,; High performance shape memory polyimides based on π-π interactions, Journal of Materials Chemistry A: Materials for Energy and Sustainability 2015, 3(1), 352-359.
Xiao, X.; Kong, D.; Qiu, X.; Zhang, W.; Zhang, F.; Liu, L.; Liu, Y.; Zhang, S.; Hu, Y.; Leng, J.: Shape-Memory Polymers with Adjustable High Glass Transition Temperatures, Macromolecules 2015, 48, 3582-3589.
Ryu, Jennie; D'Amato, Matteo; Cui, Xiaodong; Long, Kevin N.; Jerry Qi, H.; Dunn, Martin L.; Photo-origami-Bending and folding polymers with light, Applied Physics Letters 2012, 100(16), 161908/1-161908/5.
Liu, Ying; Boyles, Julie K.; Genzer, Jan; Dickey, Michael D.; Self-folding of polymer sheets using local light absorption, Soft Matter 2012, 8(6), 1764-1769.
Ahn, Bok Yeop; Shoji, Daisuke; Hansen, Christopher J.; Hong, Eunji; Dunand, David C.; Lewis, Jennifer A.; Printed origami structures, Advanced Materials, 2010, 22(20), 2251-2254.
You, Zhong; Folding structures out of flat materials, Science 2014, 345(6197), 623-624.
Wu, W.; You, Z.; A solution for folding rigid tall shopping bags, Proceedings of the Royal Society A: Mathematical, Physical and Engineering Sciences 2011, 467, 2561-2574.

(Continued)

*Primary Examiner* — Gregory Listvoyb
(74) *Attorney, Agent, or Firm* — AFMCLO/JAZ; James F. McBride

(57) ABSTRACT

The invention generally relates to polymer nanocomposite films that possess shape memory properties at elevated temperatures. Such films can absorb microwaves, are thermally conductive, are electrically conductive and have increased mechanical strength. In addition, the present invention relates to methods of fabricating such films into 3D objects. Due to the improved properties of such films more advanced sensors and microwave shields can be constructed.

6 Claims, 12 Drawing Sheets

(56) References Cited

OTHER PUBLICATIONS

Merali, Z.; Origami Engineer Flexes to Create Stronger, More Agile Materials, Science 2011, 332, 1376.
U.S. Appl. No. 16/752,787.
CN-104355302-A English Language Abstract.

* cited by examiner

SHAPE-MEMORY POLYIMIDE NANOCOMPOSITES AND FABRICATION OF SAME

CROSS-REFERENCE TO RELATED APPLICATION

The present application claims priority to U.S. patent application Ser. No. 16/752,787 filed Jan. 27, 2020, which in turn claims priority to U.S. Provisional Application Ser. No. 62/908,196 filed Sep. 30, 2019, the contents of both priority documents hereby being incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The invention generally relates to shape memory composite films that possess shape memory properties at elevated temperatures. In addition, the present invention relates to methods of fabricating such films.

BACKGROUND OF THE INVENTION

Shape memory polymers (SMPs) are a class of active materials that can be programmed to "fix" a temporary shape or a series of temporary shapes, and then later to recover to a "memorized" permanent shape established by a covalent or physical network by applying an environmental stimulus that, for example, heats the SMP. Unfortunately current SMPs are not suitable for all applications as they do not offer the desired level and combination of microwave absorption, thermal conductivity, electrical conductivity, high trigger temperature and mechanical strength.

Applicants recognized that the source of the aforementioned problems was that the current SMPs lacked free paths for electron mobility and the aliphatic bonds of the current SMPs were not sufficiently thermally and thermo-oxidatively resistant. Applicants discovered that such problems could be effectively solved by adding carbon based nanomaterials to such SMPs and using aromatic monomers to construct the SMPs of the present invention. While not being bound by theory, Applicants believe that such carbon based nano-materials interconnect thus forming a network that provides the required free paths for electron mobility and that such aromatic monomers provide increased thermally and thermo-oxidatively resistance as aromatic bonds are less subject to thermal agitation. As a result, Applicants disclose herein, SMPs that are suitable, among other things, for advanced sensors and microwave shield applications.

SUMMARY OF THE INVENTION

The invention generally relates to shape memory composite films that possess shape memory properties at elevated temperatures. Such films can absorb microwaves, are thermally conductive, are electrically conductive and have increased mechanical strength. In addition, the present invention relates to methods of fabricating such films. Due to the improved properties of such films more advanced sensors and microwave shields can be constructed.

BRIEF DESCRIPTION OF THE DRAWINGS

The accompanying drawings, which are incorporated in and constitute a part of this specification, illustrate embodiments of the invention and, together with the summary given above, and the detailed description given below, serve to explain the invention.

blending-(ii) adding CNM, (iii) sonication, (iv) adding a crosslinker, and fabrication of 3D object comprised of crosslinked polyimide/poly(amide-imide) nanocomposite (XPI-XPAI/CNM) and consisting of 2D (film) and 3D (origami object) fabrication, viz. steps (v)-(vi) and steps (vii)-(ix), respectively, and removal of supporting substrate, step (vii). This example pertains to generation of either amine-terminated or anhydride-terminated polymer blend that reacts fully with stoichiometric amount of a trianhydride crosslinker (POTAn) or triamine crosslinker (POTAm), respectively.

Figure 4:
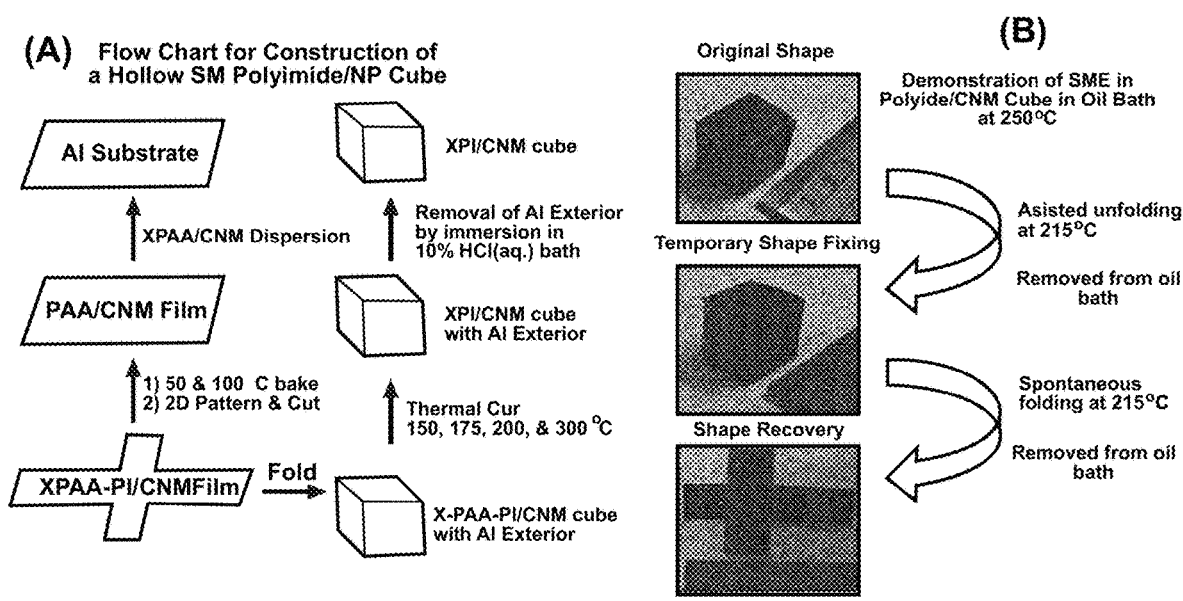

FIG. 4 depicts (A) Flow chart for the construction of a six-side box via poly(amic acid)/crosslinking/polyimide/CNM processing chemistry; and (B) high-temperature shape-memory effect of crosslinked polyimide/CNM object.

Figure 5:
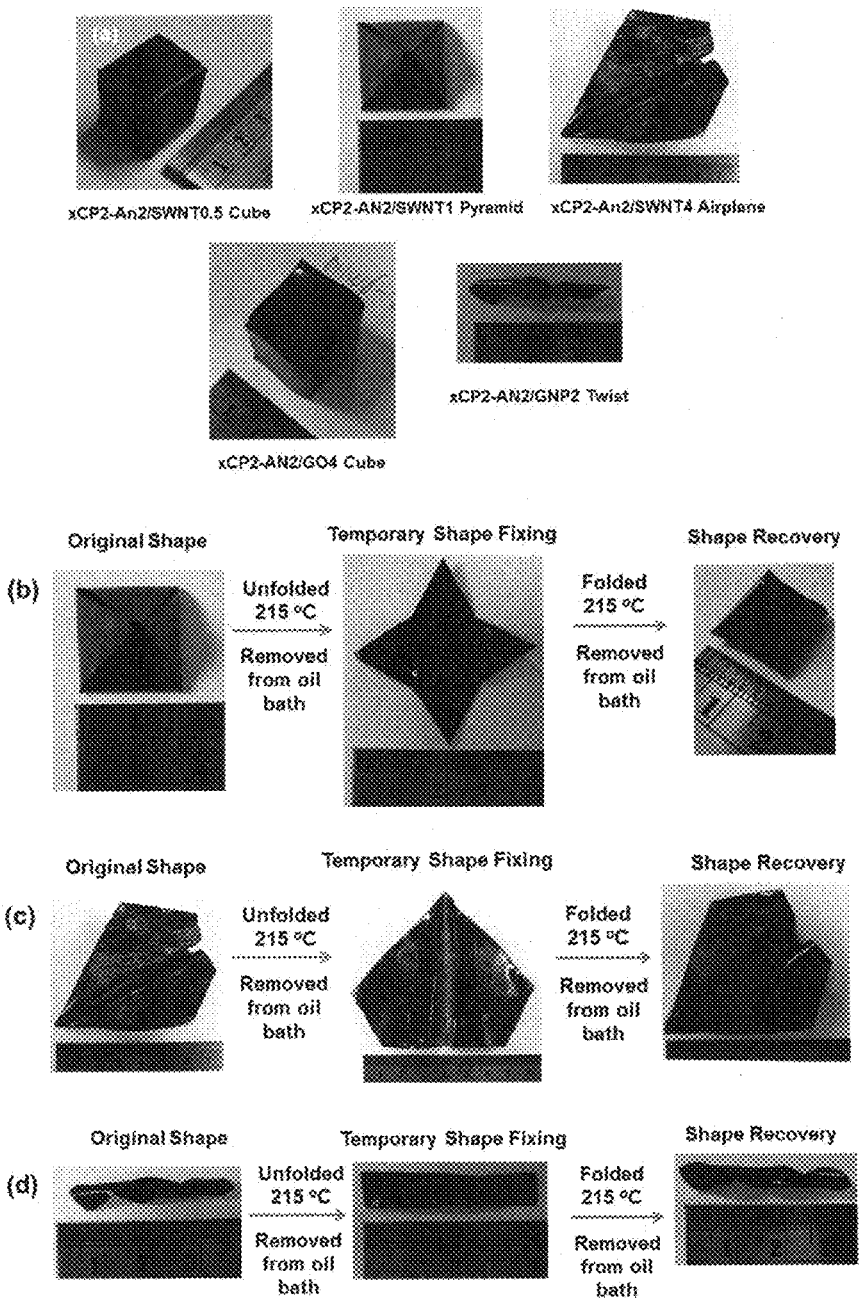

FIG. 5 depicts (a) representative 3D objects which were fabricated from nanocomposite comprised of XCP2 and CNM such as SWNT, graphene oxide (GO) and graphite nanoplatelet (GNP); (b) Pictorial description of a shape-memorizing XCP2-An2/SWNT0.5 nanocomposite pyramid with a temporary 2D shape at room temperature that would undergo ~100% shape recovery at 215° C.; (c) Similar pictorial description of a shape-memorizing XCP2-An2/SWNT0.5 nanocomposite "airplane"; (d) Similar pictorial description of a shape-memorizing XCP2-An2/SWNT0.5 nanocomposite twist.

Figure 6:
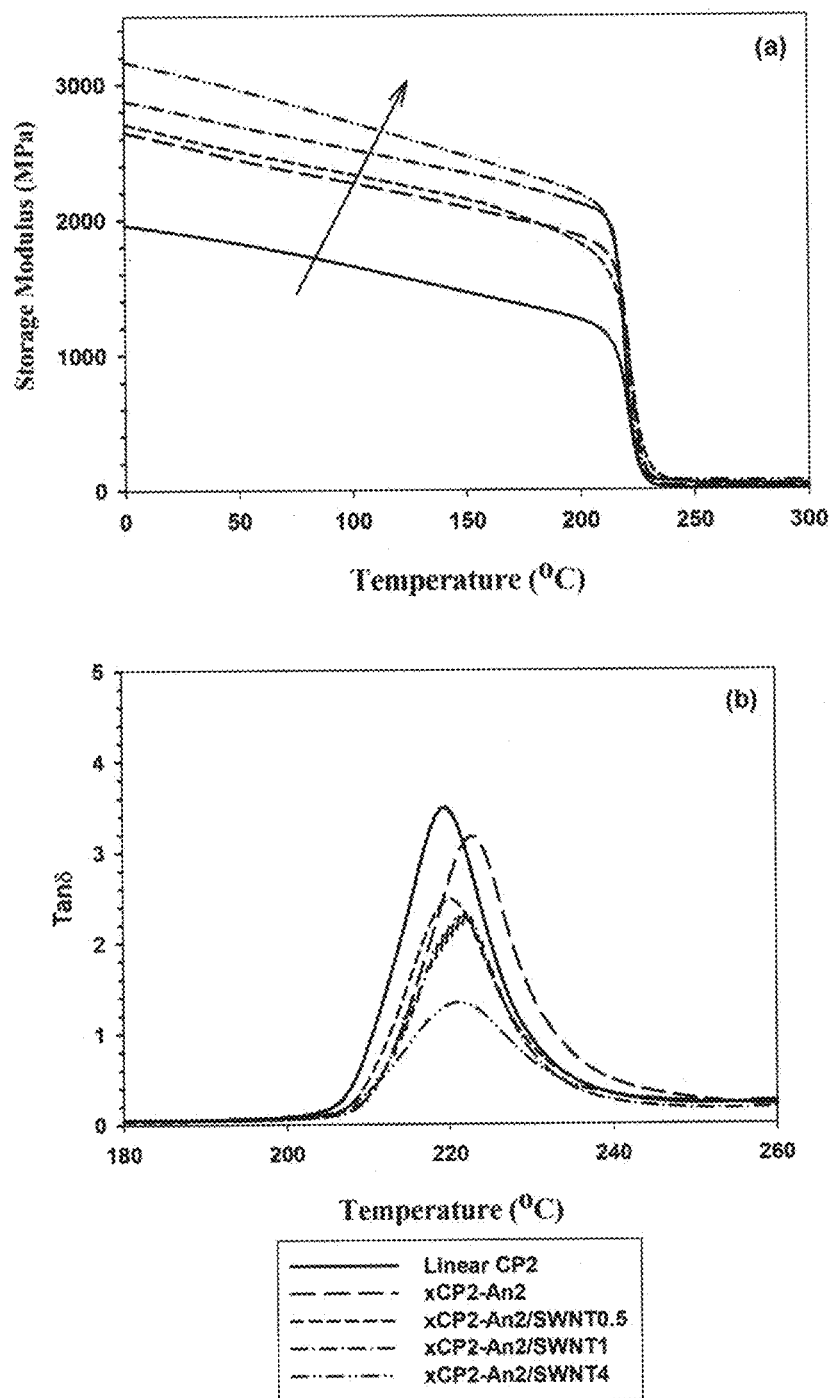

FIG. 6 Dynamic mechanical analysis of linear CP2 and a series of crosslinked CP2/SWNT films to compare their moduli and relative dimensional stability on the glass-transition plateau as a function of the SWNT content. Plot (a) exhibits the dependence of storage modulus on the SWNT-content at a given temperature prior to glass transition. Plot (b) exhibits the Tan δ as a function of temperature, and indicates that low content of SWNT (≤4 wt %) has little or no effect on the glass transition of crosslinked CP2.

Figure 7:
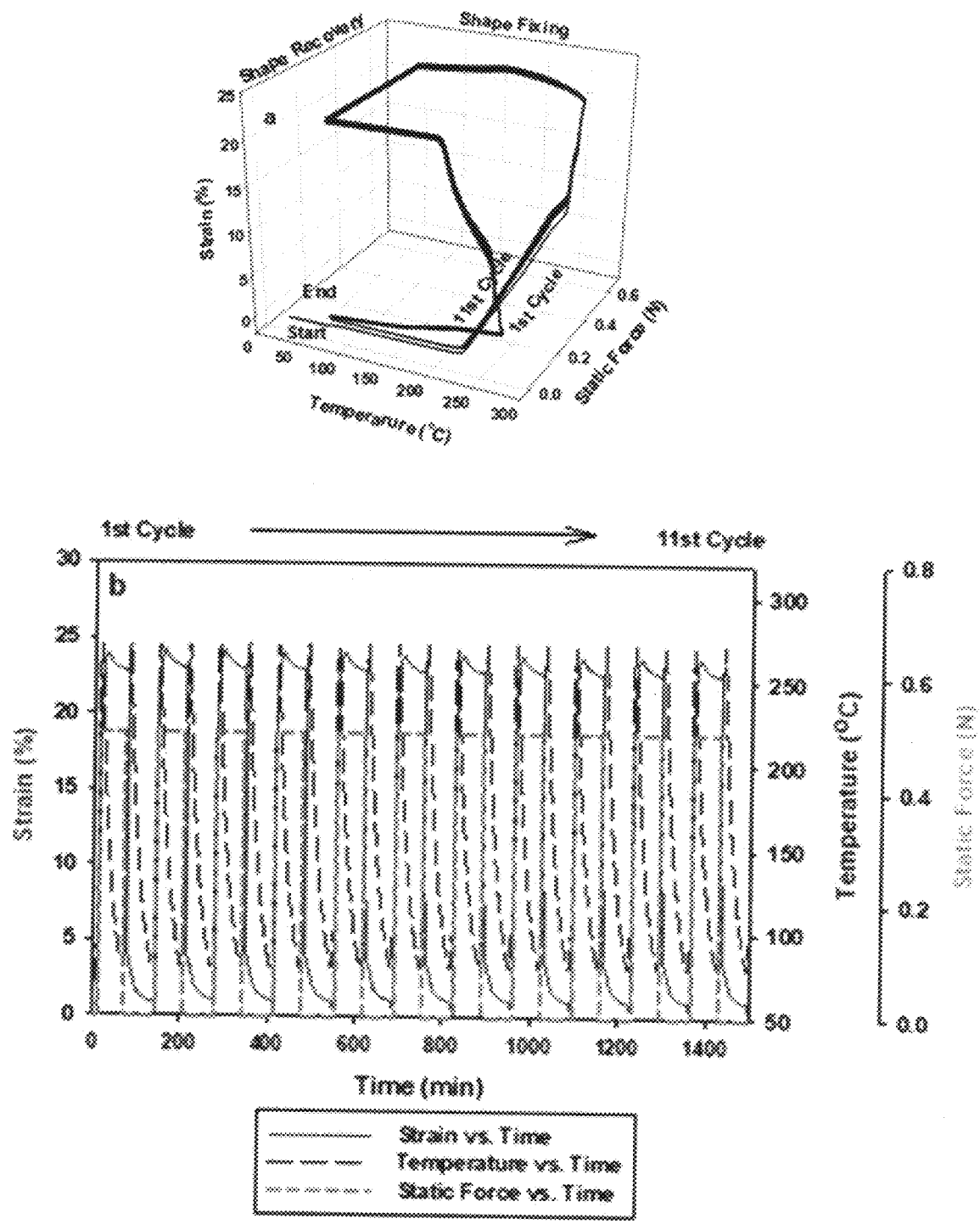

FIG. 7 depicts (a) a three-dimensional shape memory stress-strain-temperature data of XCP2-An2/SWNT0.5 nanocomposite film; (b) a two-dimensional plot of Strain (%), Static Force (N), and Temperature (° C.) versus time showing data from a demonstration of change of strain, stress, with temperature and time on a dynamic mechanical analyzer (DMA) using a sample film of XCP2-An2/SWNT0.5 nanocomposite, which was processed in accordance with an embodiment of the present invention. The shape memory performance was evaluated by 11 stress-strain-temperature (SST) cycles at 220° C. (~glass transition temperatures), which was used as the triggering temperature.

Figure 8:
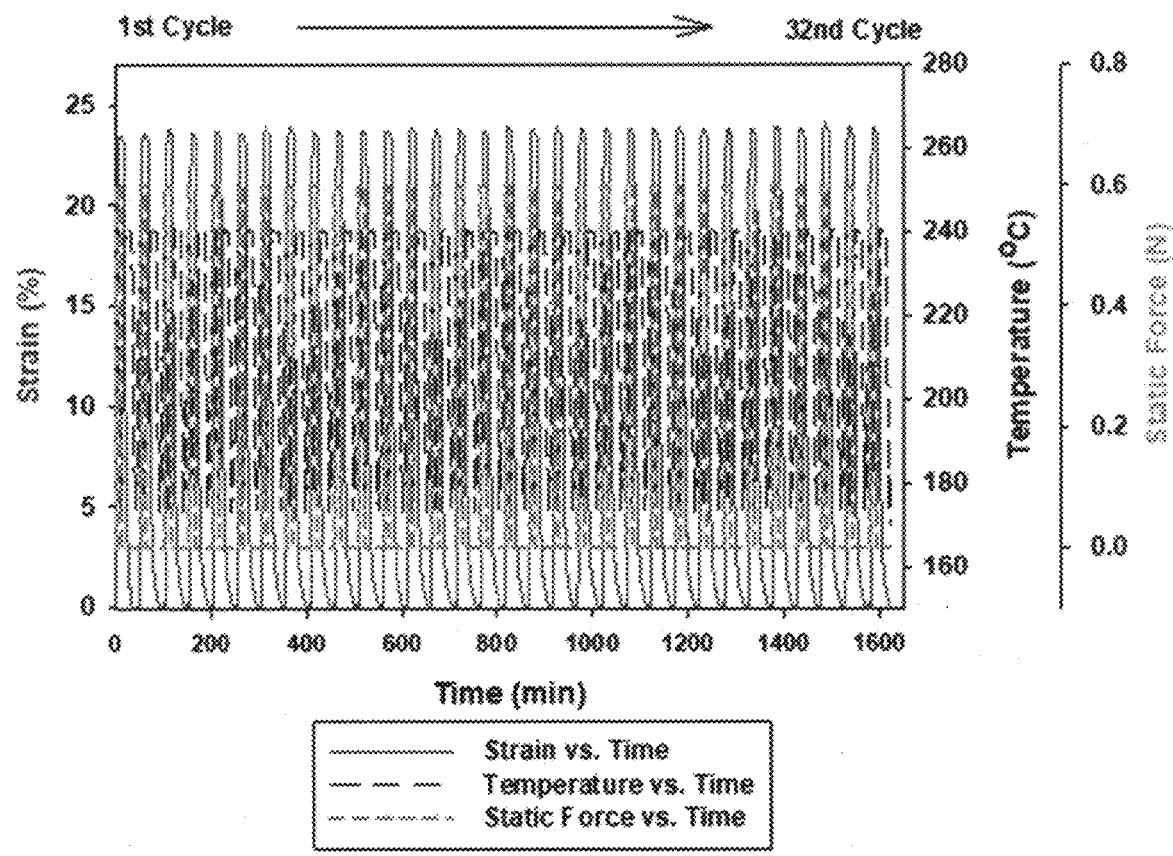

FIG. 8 is a two-dimensional plot of Strain (%), Static Force (N), and Temperature (C) versus time showing data from a demonstration of change of strain, stress, with temperature and time on a dynamic mechanical analyzer (DMA) using a sample film of XCP2-An2/SWNT1 nanocomposite, which was processed in accordance with an embodiment of the present invention. The shape memory performance was evaluated by 32 stress-strain-temperature (SST) cycles at 240° C. (above the glass transition temperatures ~221° C.), which was used as the triggering temperature.

Figure 9:
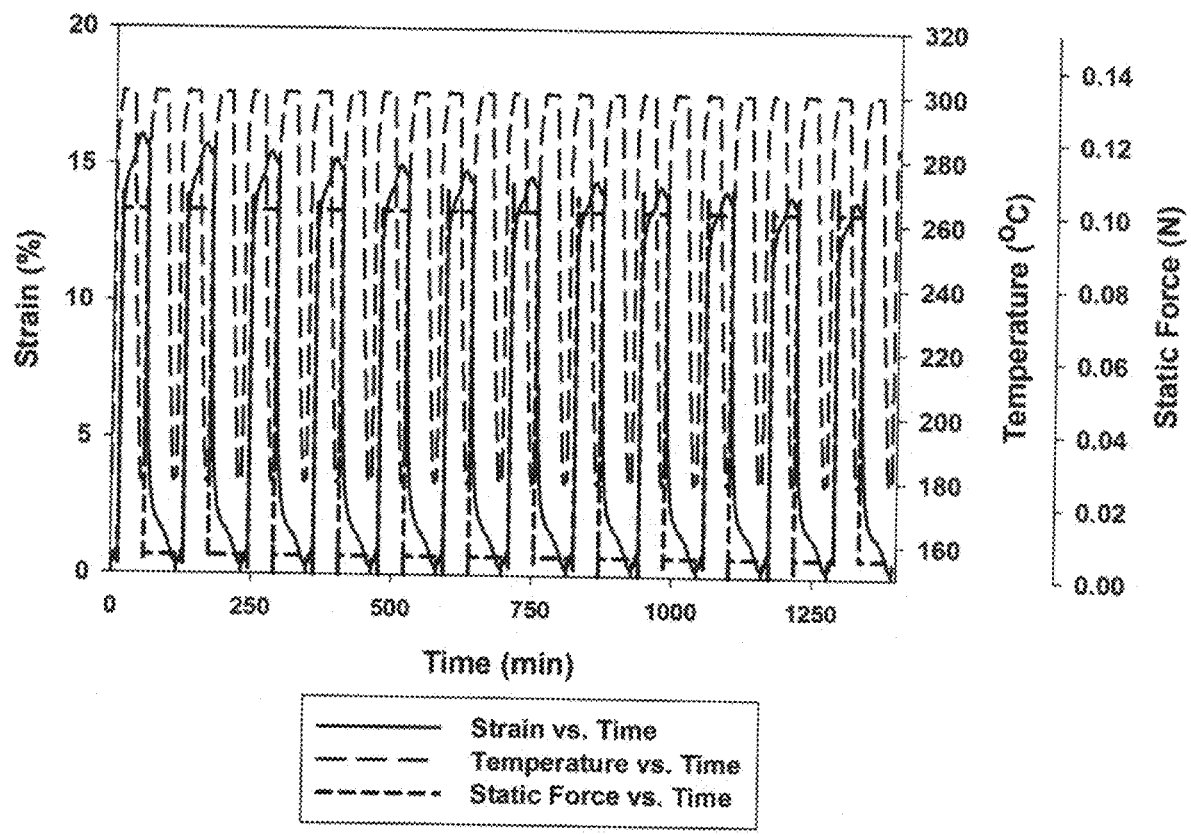

FIG. 9 is a two-dimensional plot of Strain (%), Static Force (N), and Temperature (C) versus time showing data from a demonstration of change of strain, stress, with temperature and time on a dynamic mechanical analyzer (DMA) using a sample film of XCP2-An2/GO4 nanocomposite, which was processed in accordance with an embodiment of the present invention. The shape memory performance was evaluated by 12 stress-strain-temperature (SST) cycles at 300° C. (above the glass transition temperatures ~220° C.), which was used as the triggering temperature.

Figure 10:
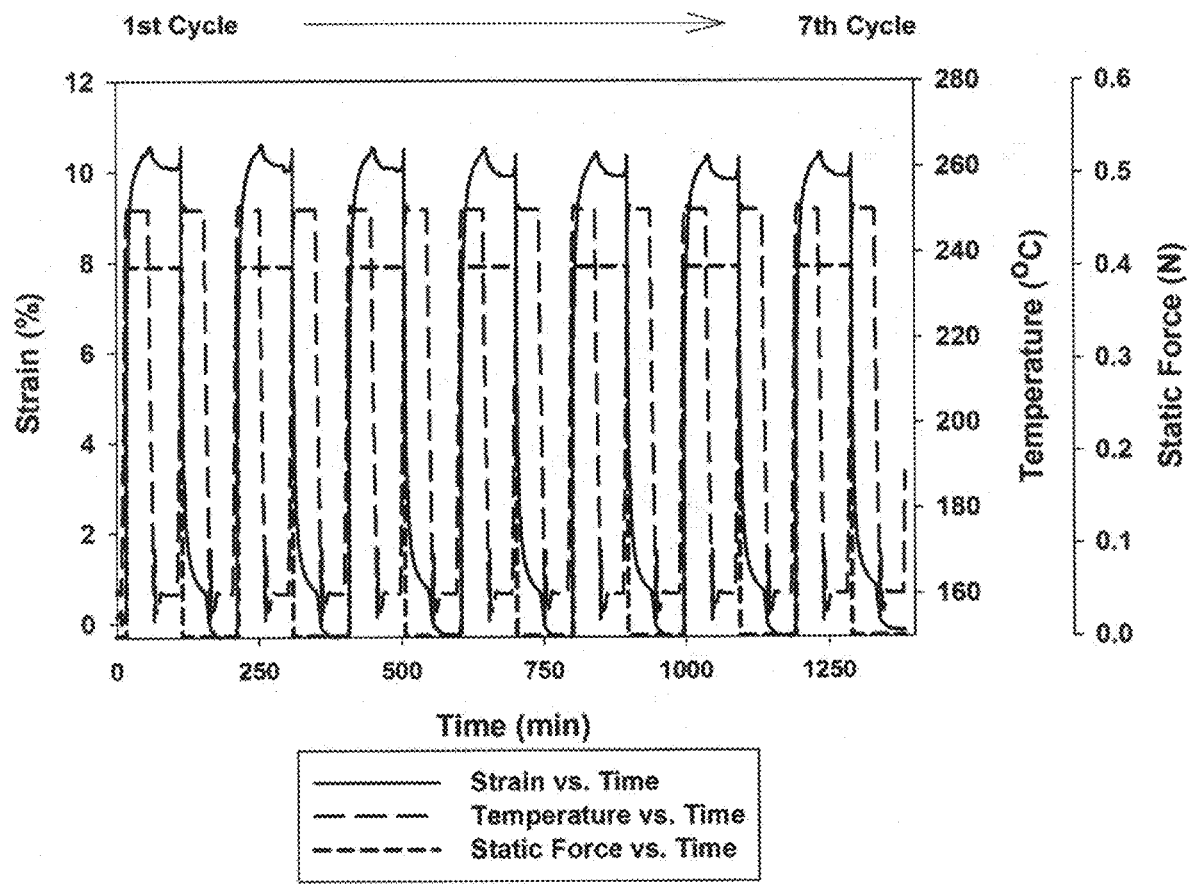

FIG. 10 is a two-dimensional plot of Strain (%), Static Force (N), and Temperature (C) versus time showing data from a demonstration of change of strain, stress, with temperature and time on a dynamic mechanical analyzer (DMA) using a sample film of XCP2-An2/GNP2 nanocomposite, which was processed in accordance with an embodiment of the present invention. The shape memory performance was evaluated by 7 stress-strain-temperature (SST) cycles at 250° C. (above the glass transition temperatures) ~224° C., which was used as the triggering temperature.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, "nano" when used in "carbon based nano-material" means at least one of x, y and z dimensions of the carbon based nano-material is 100 nanometers or less.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Method of Fabricating a Shape Memory Polymer or a Shape Memory Polymer Nanocomposite Film For purposes of this specification, headings are not considered paragraphs and thus this paragraph is Paragraph 0026 of the present specification. The individual number of each paragraph above and below this paragraph can be determined by reference to this paragraph's number. In this paragraph 0026, Applicants disclose a method for fabricating a shape memory polymer nanocomposites into a three-dimensional object, comprising:

a) treating a solution comprising:
  (i) a carbon based nano-material, preferably said carbon based nano-material is selected from the group consisting of carbon nanotubes,
  carbon nanofibers, graphene oxide, graphite nanoplatelets; preferably, the weight ratio of polymer to carbon based nano-material is from about 99.9:0.1 to about 50:50, preferably 99.9:0.1 to about 90:10, more preferably from about 99:1 to about 95:5, suitable carbon based nano-material can be purchased from Strem Chemicals, Inc., 7 Mulliken Way, Newburyport, MA 01950-4098 USA; Pyrograf Products, Inc, 154 W. Xenia Ave. Cedarville, Ohio 45314;

(ii) a polymeric intermediate, said polymeric intermediate being selected from the group consisting of a poly(amic acid) intermediate (said poly(amic acid) intermediate can be a reaction product of an aromatic diamine monomer and a dianhydride-containing monomer), a poly(amide-amic acid) intermediate (said poly(amide-amic acid) can be a reaction product of an aromatic diamine monomer and a (anhydride-acid chloride) containing monomer), a copolymer intermediate of poly(amic acid) and poly(amide-amic acid) and mixtures thereof, preferably said polymeric intermediate is terminally anhydride-functionalized or amine-functionalized;

(iii) a solvent, preferably a polar aprotic solvent, more preferably N,N-dimethylformamide (DMF), N,N-dimethylacetamide (DMAc), and/or N-methylpyrrolidone (NMP)

with a multi-functional crosslinking agent to thereby form a sol-gel comprising a carbon based nanomaterial and a crosslinked poly(amic acid), a crosslinked poly(amide-amic acid) and/or a crosslinked copolymer of poly(amic acid) and poly(amide-amic acid), said multi-functional crosslinking agent comprising at least a tri-functionalized-amine crosslinking agent when said polymeric intermediate is anhydride end-functionalized and said multi-functional crosslinking agent comprising at least a tri-functionalized anhydride crosslinking agent when said polymeric intermediate is amine end-functionalized;

b) forming a film of said sol-gel on a substrate to provide a laminated substrate;

c) evaporating at least a portion of the solvent from the sol-gel by heating the sol-gel to a temperature in a range of about 50° C. to about 100° C. at a pressure less than about atmospheric pressure;

d) forming the laminated substrate into a first configuration that is in a three-dimensional form;

e) curing, via heating, said sol-gel's crosslinked poly(amic acid), said crosslinked poly(amide-amic acid) and/or a crosslinked copolymer of poly(amic acid) and poly(amide-amic acid) to provide the shape memory polymer having a permanent shape corresponding to the first configuration, wherein the shape memory polymer comprises a crosslinked polyimide, a crosslinked poly(amide-imide) and/or a crosslinked copolymer of polyimide and poly(amide-imide), in one aspect, said curing comprises heating said crosslinked poly(amic acid) to temperatures of about 150° C., about 175° C., about 200° C., about 250° C., and/or about 300° C. and maintaining each of said temperatures for about one hour; and f) removing the substrate from the laminated substrate to provide the three-dimensional object comprising the shape memory polymer, preferably said removal comprises chemically removing the substrate from the laminated substrate.

Applicants disclose the method of Paragraph 0026, comprising:

a) heating the three-dimensional object to a first temperature that is above a triggering temperature;

b) deforming the three-dimensional object to a second configuration that is different from the first configuration; and c) lowering the three-dimensional object to a second temperature that is below the triggering temperature while the three-dimensional object is maintained in the second configuration.

Applicants disclose the method of Paragraph 0027, comprising: heating the three-dimensional object in the second configuration to a third temperature that is above the triggering temperature to thereby induce the self-rearrangement of the three dimensional object from the second configuration to the first configuration.

Applicants disclose the method of Paragraphs 0026 through 0028, wherein forming a film of said sol-gel on a substrate comprises partially curing the said sol-gel's crosslinked poly(amic acid), said crosslinked poly(amide-amic acid) and/or a crosslinked copolymer of poly(amic acid) and poly(amide-amic acid) to form a crosslinked polyimide, a crosslinked poly(amide-imide) and/or a crosslinked polyimide poly(amide-imide) copolymer.

Applicants disclose the method of Paragraphs 0026 through 0029 wherein the substrate comprises a metal that dissolves in an aqueous acid solution, preferably said metal comprises aluminum.

Applicants disclose the method of Paragraphs 0026 through 0030 wherein the multi-functional anhydride crosslinking agent has the following chemical formula:

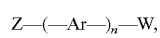

wherein Z represents an anhydride functional group that is directly or indirectly bonded to Ar; Ar represents an aryl group that is directly bonded to W; and n is equal to 3 when W is P=O or N, or n is equal to 4 when W is Si or a carbon moiety.

Applicants disclose the method of Paragraph 0031 wherein Ar is a phenyleneoxy group (—OPh-) that is para- or meta-substituted with respect to oxygen, and the multi-functional anhydride crosslinking agent has the following chemical formula:

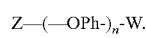

Applicants disclose the method of Paragraph 0031 wherein Z and Ar in combination form a phthalic anhydride moiety that is directly bonded to W.

Applicants disclose the method of Paragraph 0031 wherein Ar is a phenyleneoxy group (—OPh-) that is para- or meta-substituted with respect to oxygen, and wherein Z is a phthalic anhydride group that is connected to the phenyleneoxy group through an ether bond.

Applicants disclose the method of Paragraph 0031 wherein W is P=O, wherein Ar is a phenyleneoxy group (—OPh-) that is para- or meta-substituted with respect to oxygen, and wherein the multi-functional anhydride crosslinking agent has the following chemical formula:

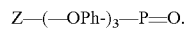

Applicants disclose the method of Paragraph 0035 wherein Z is a phthalic anhydride group that is connected to the phenyleneoxy group through an ether bond, and wherein the multi-functional anhydride crosslinking agent has the following chemical formula:

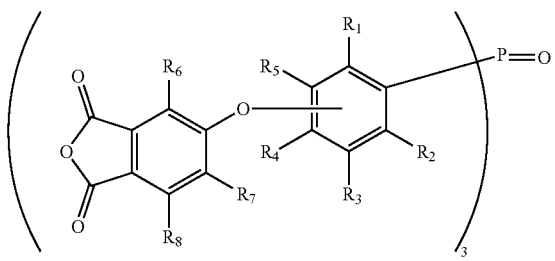

wherein $R_1$ through $R_8$ are each independently selected from H or $C_1$-$C_4$ alkyl.

Applicants disclose the method of Paragraph 0035 wherein the multi-functional anhydride crosslinking agent is selected from tris[3-(3,4-dicarboxyphenoxy)phenyl]phosphine oxide trianhydride or tris[4-(3,4-dicarboxyphenoxy)phenyl]phosphine oxide trianhydride.

Applicants disclose the method of Paragraph 0031 wherein W is N, wherein Ar is a phenyleneoxy group (—OPh-) that is para- or meta-substituted with respect to oxygen, and wherein the multi-functional anhydride crosslinking agent has the following chemical formula:

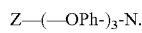
Z—(—OPh-)$_3$-N.

Applicants disclose the method of Paragraph 0038 wherein Z is a phthalic anhydride group that is connected to the phenyleneoxy group through an ether bond, and wherein the multi-functional anhydride crosslinking agent has the following chemical formula:

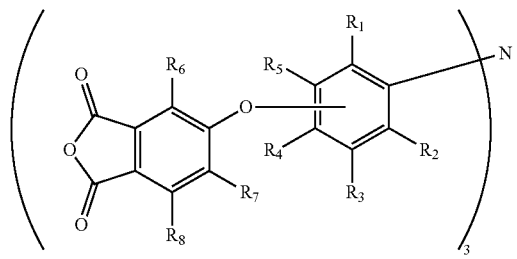

wherein $R_1$ through $R_8$ are each independently selected from H or $C_1$-$C_4$ alkyl.

Applicants disclose the method of Paragraph 0038 wherein the agent is selected from tris[3-(3,4-dicarboxyphenoxy)phenyl]amine trianhydride or tris[4-(3,4-dicarboxyphenoxy)phenyl]amine trianhydride.

Applicants disclose the method of Paragraph 0031 wherein W is N, wherein Z and Ar in combination form a phthalic anhydride moiety that is directly bonded to N, and wherein the agent has the following chemical formula:

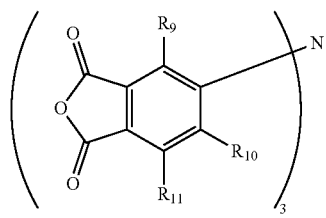

wherein $R_9$ to $R_{11}$ are each independently selected from H or $C_1$-$C_4$ alkyl.

Applicants disclose the methods of Paragraphs 0026 through 0030 wherein the multi-functional amine crosslinking agent comprises a tri(oxybenzene-amine) crosslinker having the following chemical formula:

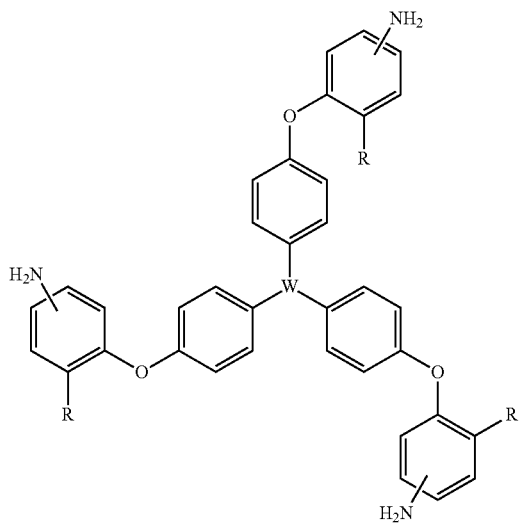

wherein W is selected from a group consisting of $CH_3C$, N, P=O, or $BO_3$; R is selected from a group consisting of H, F, Cl, $CF_3$, or $CH_3$; and the amine groups are located meta or para with respect to R.

The formation of the laminated substrate comprised of a shape memory polymer or a related shape-memory polymer nanocomposite and a removable substrate may be based on origami techniques. As commonly known, origami is a Japanese art based on folding paper, but in recent years, the concept has been advanced beyond artistic creations and toys such that three-dimensional, complex objects now can be designed to be capable of on-command transformation into a wide range of devices and robotic systems. Easily taken for granted examples to illustrate the utility of origami concept can be found in foldable maps, shopping bags, storage boxes and cartons, etc. More advanced examples such as automobile airbags, shock absorbers, 3D and light-trapping photovoltaics, and biomedical devices/implants such as stent further illustrate the ingenious application of origami engineering concept. In general, the origami concept is best used to solve technological problems that require solutions to (i) small-volume packaging for (ii) efficient storage and (iii) transportation, (iv) easy deployment, and in some cases (v) reusability. The most attractive features of origami concept are (i) it is scale-free, applicable from nanoscale level (protein folding and DNA origami) to kilometer-scale (solar panels) and (ii) applicable to various printing techniques.

Fundamentally, origami can be considered as a process that involves a sequence of folding steps (i.e. programmed fold or crease pattern) to eventually transform a 2-D substrate to the designed 3-D object. Therefore, important to 2D-to-3D transformation process is shape memory effect, and naturally, a requisite characteristic of the polymer substrate for origami-inspired fabrication is to have a shape-memory capability. The notion of imparting elastomer-like shape memory effect to thermoplastic or crosslinked polymers may be based on three different mechanisms: thermal, photothermal, and photochemical mechanisms.

Sol-Gel, Film and Two and Three Dimensional Objects

Applicants disclose a sol-gel comprising:
a) a polymer selected from the group consisting of a crosslinked polyimide, a crosslinked poly(amide-imide), a crosslinked polyimide poly(amide-imide) copolymer and mixtures thereof; and
b) a carbon based nano-material, preferably said carbon based nano-material is selected from the group consisting of carbon nanotubes, carbon nanofibers, graphene oxide, graphite nanoplatelets; more preferably said carbon based nano-material has a maximum dimension of from about 100 nanometers to 1 nanometer; preferably, the weight ratio polymer to carbon based nano-material is from about 99:1 to about 90:10.

Applicants disclose a shape memory composite film comprising:
a) a polymer selected from the group consisting of a crosslinked polyimide, a crosslinked poly(amide-imide), a crosslinked polyimide poly(amide-imide) copolymer and mixtures thereof; and
b) a carbon based nano-material, preferably said carbon based nano-material is selected from the group consisting of carbon nanotubes, carbon nanofibers, graphene oxide, graphite nanoplatelets; more preferably said carbon based nano-material has a maximum dimension of from about 100 nanometers to 1 nanometer; preferably, the weight ratio polymer to carbon based nano-material is from about 99.9:0.1 to about 50:50, preferably 99.9:0.1 to about 90:10, more preferably from about 99:1 to about 95:5.

Applicants disclose a two or three dimensional object derived from the sol-gel according to Paragraph 0045.

Applicants disclose a two or three dimensional object derived from the film according to Paragraph 0046.

Crosslinked Polyimide and Poly(Amide-Imide) Polymers and Co-Polymers

Because of the similar polymerization chemistry to generate polyimides, poly(amide-imides), and co-polymers comprised of polyimides and poly(amide-imides), the multifunctional crosslinking agents disclosed herein may be used to crosslink these classes of polymers to create covalent network structures capable of showing shape memory effects at elevated temperatures.

Synthesis of a polyimide is typically accomplished by polymerization of a diamine and a dianhydride in a 1:1 molar ratio to generate a poly(amic acid) precursor, which is then converted to the corresponding polyimide typically by either thermal cure (e.g., by heating to >200° C. in solution or solid state) or chemical imidization using a dehydrating agent or promoter such as acetic anhydride/triethylamine or acetic anhydride/pyridine. However, to generate a polyimide having the desired amount of crosslinking, an appropriately-terminated poly(amic acid) precursor is first generated by off-setting the dianhydride:diamine ratio. For example, to provide an amine-terminated poly(amic acid) precursor, the amount of diamine is used in excess to cap both ends of the poly(amic acid) precursor. An appropriate amount of a multi-anhydride crosslinking agent is then added to the precursor solution so that all or substantially all of the terminal amine groups will be consumed. Conversely, to provide an anhydride-terminated poly(amic acid) precursor, the amount of di-anhydride-containing monomer is used in excess to cap both ends of the poly(amic acid) precursor. Then an appropriate amount of a multi-amine crosslinking agent is then added to the precursor solution so that all or substantially all of the terminal anhydride groups will be consumed. In either embodiment, crosslinked polyimides may then be created using appropriate imidization conditions.

In accordance with an aspect of the polymer, the diamine monomer comprises an aromatic diamine, which includes, but is not limited to, 1,3-bis(3-aminophenoxy)benzene (APB); 1,4-bis(3-aminophenoxy)benzene; 1,2-bis(3-aminophenoxy)benzene; 1,2-bis(4-aminophenoxy)benzene; 1,3-bis(4-aminophenoxy)benzene; 1,4-bis(4-aminophenoxy)benzene; 3,4'-oxydianiline; 4,4-oxydianiline; 1,3-diamino-4-methylbenzene; 1,3-diamino-4-(trifluoromethyl)benzene; 2,4-diaminobiphenyl; 2,2-bis(4-aminophenyl)-1,1,1,3,3,3-hexafluoropropane; 2,2-bis(4-aminophenyl)propane; 2,2-bis[4-(4-aminophenoxy)phenyl]-1,1,1,3,3,3-hexafluoropropane; 2,2-bis[4-(4-aminophenoxy)phenyl]propane; or a mixture of thereof.

In accordance with another aspect, the dianhydride monomer includes, but is not limited to 2,2-[bis(4-phthalic anhydrido)]-1,1,1,3,3,3-hexafluoroisopropane (6FDA); 4,4'-oxybis(phthalic anhydride); 3,3',4,4'-diphenylsulfone tetracarboxylic dianhydride; 3,3',4,4'-benzophenone tetracarboxylic dianhydride; 4,4'-(2,2,2-trifluoro-1-phenylethylidene)bis[phthalic anhydride]; 2,2-bis[4-(3,4-dicarboxyphenoxy)phenyl]propane dianhydride; 4,4'-(p-phenylenedioxy)bis[phthalic anhydride]; 4,4'-(m-phenylenedioxy)bis[phthalic anhydride]; 4,4'-(o-phenylenedioxy)bis[phthalic anhydride]; or mixtures thereof.

The synthesis of a poly(amide-imide) is typically accomplished by polymerization of i) a diamine and a trimellitic anhydride (TMA) or trimellitic anhydride acid chloride (TMAC); or ii) a diamine and a diimide-dicarboxylic acid monomer derived from a selective condensation of TMA and an aromatic diamine (e.g., $H_2N$—Ar—$NH_2$). When acid monomers are used, the polymerization process is aided by triethylphosphite/pyridine (Yamazaki-Higashi reagent) in a 1:1 molar ratio in an amide solvent such as N,N-dimethylformamide (DMF), N,N-dimethylacetamide (DMAc), N-methylpyrrolidone (NMP), etc.

Persons having ordinary skill in the art will appreciate that these polymerization methods may be applied to other dianhydride monomers containing pre-formed aromatic amide moieties. For example, bis(phthalic anhydride) monomers with preformed amide as part of the linking group, which are also known as diamide-dianhydrides (DADA), can be prepared from trimellitic anhydride acid chloride (TMAC) and an aromatic diamine (e.g., $H_2N$—Ar—$NH_2$) in refluxing acetone with pyridine as HCl scavenger.

However, to generate a poly(amide-imide) having the desired amount of crosslinking, an appropriately-terminated poly(amide-imide) may be first generated via Yamazaki-Higashi reaction by off-setting TMA:diamine ratio. To make the amine-terminated poly(amide-imide), the amount of diamine is in excess to cap both ends of the polymer. After the amino-terminated polyamide has been isolated by precipitation in methanol and filtration, it is washed with methanol and dried in vacuo overnight. The amino-terminated polyamide can then be dissolved or suspended in an amide solvent and mixed with an amide solution of a multi-anhydride crosslinking agent in an appropriate amount so that all or substantially all of the terminal amine groups are consumed, which is immediately followed by casting and thermal curing under reduced pressure to create crosslinked poly(amide-imide) films. Conversely, to make the anhydride-terminated poly(amide-imide), the amount of amine monomer is not used in excess and thus is the limiting reagent.

In a preferred method to generate a poly(amide-imide) having the desired amount of crosslinking, it is more suitable that an appropriately-terminated poly(amide-amic acid) is first generated by off-setting the DADA:diamine ratio so that either diamide-dianhydride or diamine is in excess. In the former case, anhydride-terminated poly(amide-amic acid) is generated, and in the latter case, amine-terminated poly (amide-amic acid). Then an appropriate amount of a multi-amine crosslinking agent or multi-anhydride crosslinking agent is then added to the respective precursor solution so that all or substantially all of the reactive terminal groups will be consumed. This is immediately followed by casting and thermal curing under reduced pressure to create cross-linked poly(amide-imide) films.

Figure 3:
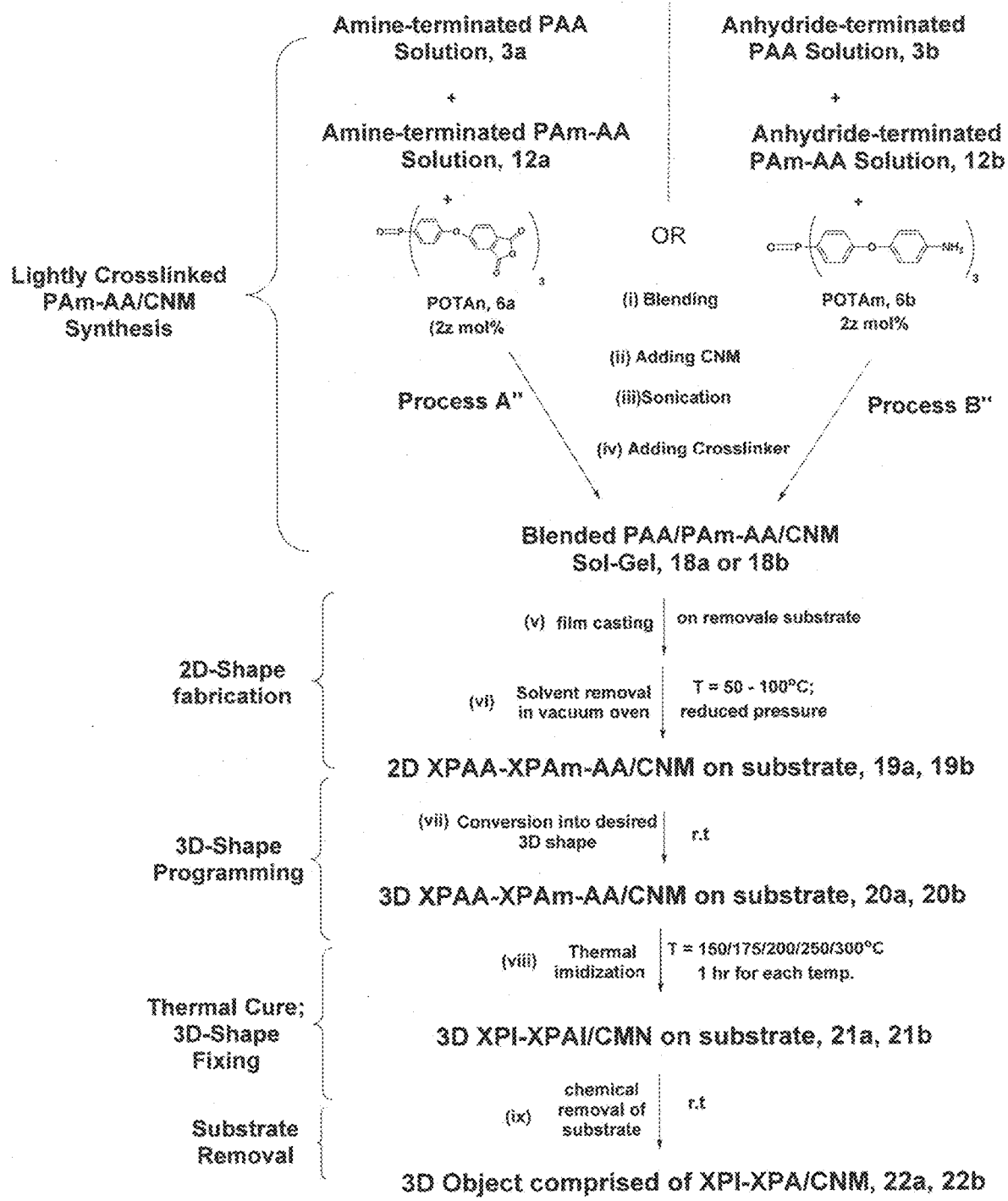
FIG. 3 is an exemplary scheme depicts the integrated process that combines in-situ synthesis of a blend of lightly crosslinked poly(amic acid) (PAA), poly(amide-amic acid) (PAm-AA), and a carbon nanomaterial (CNM), viz. steps (i)

In another embodiment in accordance with FIG. 3, a crosslinked copolymers comprised of a polyimide and a poly(amide-imide) can be prepared by mixing (A) an amine-terminated poly(amic acid) and an amine-terminated poly(amide-imide) followed by addition of a trianhydride cross-linker or (B) an anhydride-terminated poly(amic acid) and an anhydride-terminated poly(amide-imide) followed by addition of a triamine crosslinker, in appropriate amount to consume the total amount of the end groups (i.e. amine or anhydride, respectively).

The ability to vary the amount of crosslinking allows the synthesis of crosslinked polyimides and poly(amide-imides) with mechanical properties (i.e. Tg) tailored to a specific application or to specific environmental conditions. A generalized method for incorporating a sufficient amount of functionalization in the poly(amic acid)-containing precursor may be based on the desired degree of crosslinking in the resultant polyimide or poly(amic acid). For example, the general method can include selecting the desired multi-functional crosslinking agent (e.g., amine- or anhydride-functionalized) and the desired amount of crosslinking (x mol %), and then preparing the appropriately functionalized poly(amic acid)-containing precursor by employing the excess monomer in an amount of about (100+1.5x) mol %. The limiting reagent is based on 100 mol %. In one embodiment, the amount of multi-functional crosslinking agent used to crosslink the poly(amic acid) may vary from about 0.3 mol % to about 10 mol %. In another embodiment, the amount of multi-functional crosslinking agent used to crosslink the poly(amic acid) may vary from about 0.5 mol % to about 5 mol %. For example, the multi-functional crosslinking agent concentration about 0.5 mol %, about 1.0 mol %, about 2.0 mol %, or about 5.0 mol %.

Multi-Anhydride Crosslinking Agents

In accordance with an embodiment of the present invention, a multifunctional crosslinking agent is provided that has three or four anhydride functional groups (i.e., tri-anhydride crosslinking agents or tetra-anhydride crosslinking agents, respectively). The multifunctional crosslinking agents may be defined by the general chemical Formula (I): Z—(—Ar—)n-W, wherein Z represents an anhydride functional group that is directly or indirectly bonded to Ar; wherein Ar represents an aryl group that is directly bonded to W; and wherein n is equal to 3 when W is N or P=O, or n is equal to 4 when W is Si or an sp³ hybridized carbon moiety. Accordingly, the tri-anhydride crosslinking agents may be Z—(—Ar—)₃N or Z—(—Ar—)₃P=O; and the tetra-anhydride crosslinking agents may be Z—(—Ar—)₄Si or Z—(—Ar—)₄R, where R represents the carbon moiety (e.g., fluorenyl).

In accordance with an aspect of the invention, the aryl group (Ar), which is directly bonded to W through a carbon atom, may be a phenyleneoxy group (—OPh-) that is para- or meta-substituted with respect to oxygen, and thus the agent may be further defined by the general chemical Formula (II): Z—(—OPh-)$_n$-W. In one embodiment, the phenyleneoxy group represents that the benzene ring portion may unsubstituted (i.e., OC$_6$H$_4$); alternatively, the phenyleneoxy group may have substituents (e.g., C$_1$-C$_4$ alkyl groups) around the benzene ring. In one example, where W is P=O, the agent may be further defined by the general chemical Formula (III): Z—(—OPh-)$_3$-P=O. In accordance with another aspect, the aryl group (Ar) may be a phenyleneoxy group (—OPh-) that is para- or meta-substituted with respect to oxygen, and Z may be a phthalic anhydride group that is connected to the phenyleneoxy group through an ether bond. Accordingly, the agent may be further defined by the general chemical Formula (IV) below:

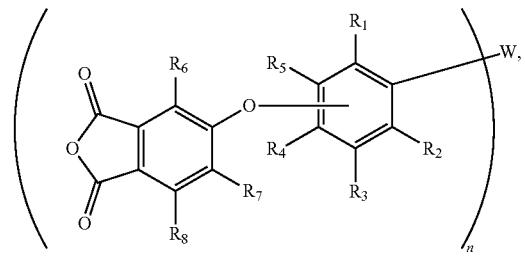

wherein W and n are as defined above, and R$_1$ through R$_8$ are independently selected from H or C$_1$-C$_4$ alkyl. Where W is P=O, these phosphine oxide-based crosslinking agents may be defined by the general chemical Formula (V) below:

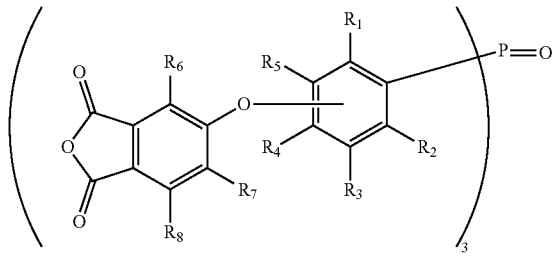

Exemplary phosphine oxide-based crosslinking agents are tris[4-(3,4-dicarboxyphenoxy)phenyl] phosphine oxide tri-anhydride (where R$_1$ to R$_3$ and R$_5$ to R$_8$ are H), and its meta-isomer, which is tris[3-(3,4-dicarboxyphenoxy)phenyl] phosphine oxide tri-anhydride (i.e., where R$_1$ to R$_4$ and R$_6$ to R$_8$ are H).

In accordance with yet another aspect, where W is N, and where the aryl group (Ar) is the phenyleneoxy group (—OPh-), which is para- or meta-substituted with respect to oxygen, a tertiary amine-based crosslinking agent may be defined by the general chemical Formula (VI): (Z—OPh-)$_3$N. In another embodiment, where Z is the phthalic anhydride group that is connected to the phenyleneoxy group through an ether bond, exemplary tertiary amine-based crosslinking agents may be defined by the general chemical Formula (VII) below:

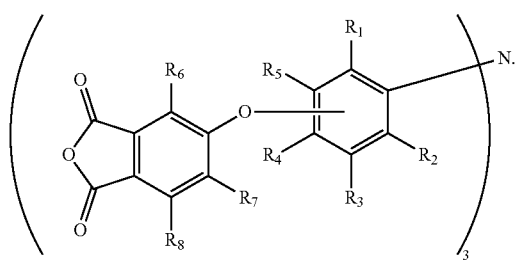

Exemplary tertiary amine-based crosslinking agents are tris[4-(3,4-dicarboxyphenoxy)phenyl]amine tri-anhydride (where $R_1$ to $R_3$ and $R_5$ to $R_8$ are H), and its meta-isomer, which is tris[3-(3,4-dicarboxyphenoxy)phenyl]amine tri-anhydride (i.e., $R_1$ to $R_4$ and $R_6$ to $R_8$ are H).

In accordance with another embodiment, complementary tetra-anhydride crosslinking agents include where W (in Formulas (I), (II), and (IV)) is a carbon moiety, and thus n is 4. Further, exemplary carbon-based tetra-anhydride crosslinking agents 4a, 4b, and 5c are also shown in Table 1. The carbon moiety may include a centralized $sp^3$ hybridized carbon to provide a generally tetrahedral geometry to the agent. For example, agents 4a and 4b include a fluorenyl group, where the $C_9$ carbon of the fluorenyl group is $sp^3$ hybridized.

As also shown in Table 1, the complementary tetra-anhydride crosslinking agents include where W (in Formulas (I), (II), and (IV)) is silicon or an $sp^3$ hybridized carbon, and thus n is 4. Further, exemplary silicon-based (5a and 5b, E=Si) or $sp^3$ hybridized carbon-based (5c and 5d, E=C) tetra-anhydride crosslinking agents are also shown in Table 1 below.

TABLE 1

| Exemplary Multi-Anhydride Crosslinking Agents |
|---|
| Tri-anhydride crosslinkers |

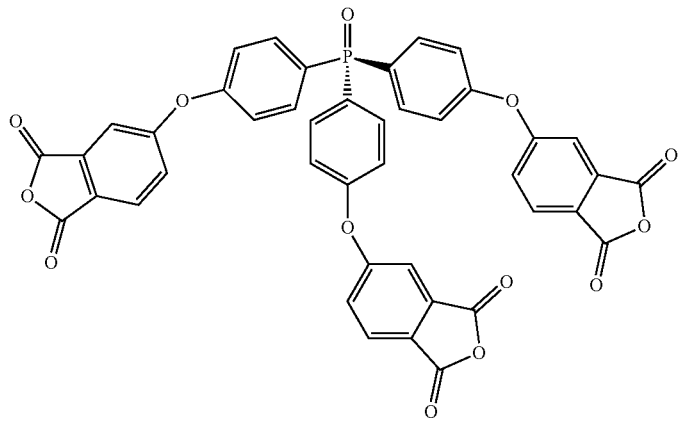

1a

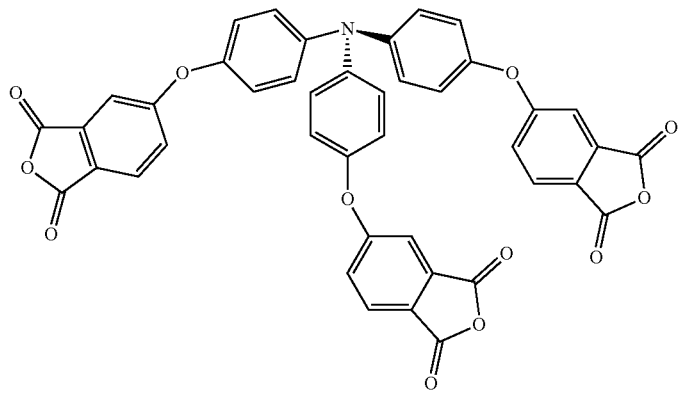

2a

TABLE 1-continued
Exemplary Multi-Anhydride Crosslinking Agents
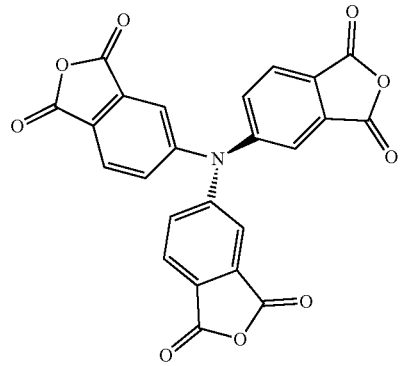
3
Tetra-anhydride crosslinkers
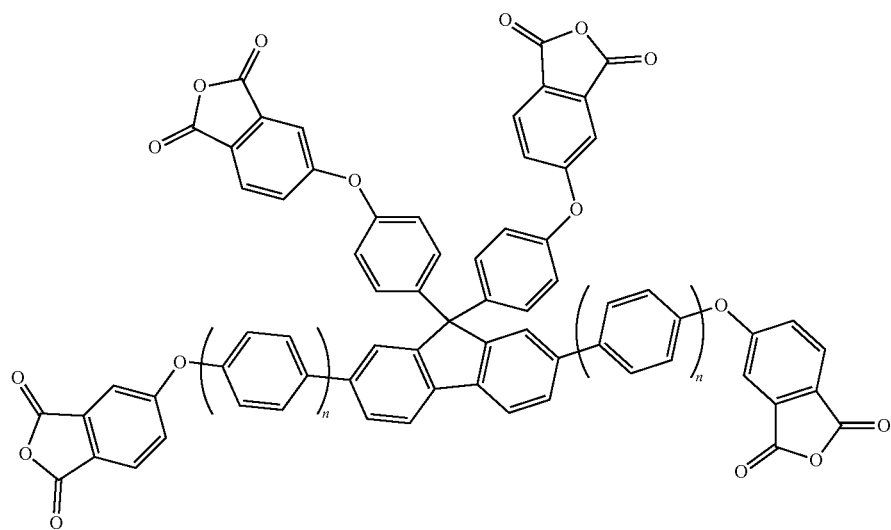
4a (n = 0)
4b (n = 1)

TABLE 1-continued

Exemplary Multi-Anhydride Crosslinking Agents

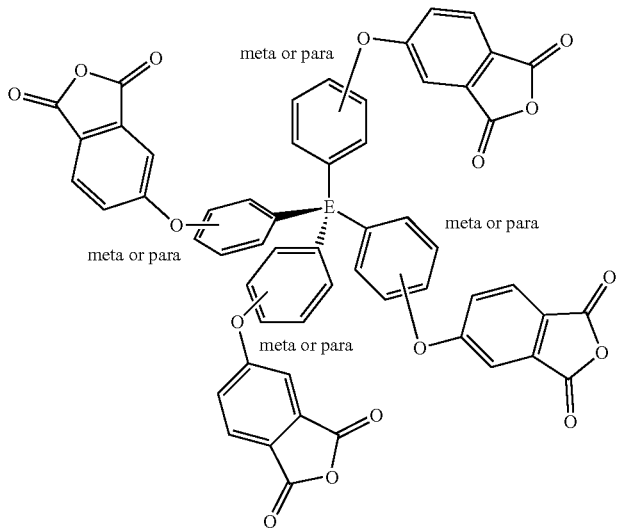

5a (E = Si; all para)
5b (E = Si; all meta)
5c (E = C; all para)

In accordance with an embodiment, the crosslinked polyimides obtained with the multi-anhydride crosslinking agents may be defined by the following general chemical Formula (VIII) below:

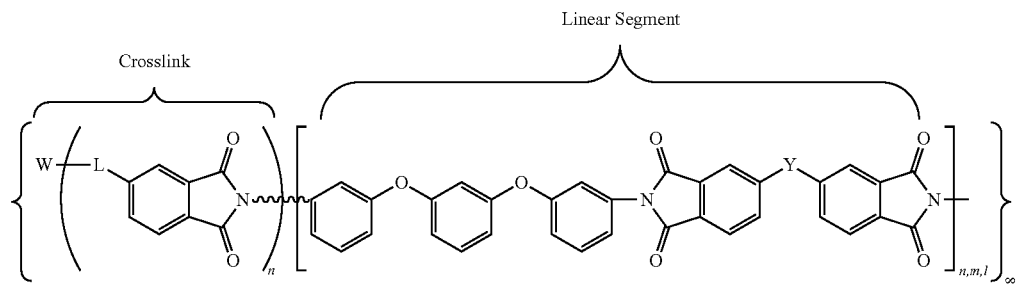

where W may be P=O, N, Si, or a carbon moiety (e.g., fluorenyl); wherein L denotes either a direct covalent bond to W or a linking group (e.g., a phenyleneoxy group) for indirect bonding to W; n, m, 1 denote the degree of polymerization (DP) of each branch of polyimide, which may be of the same or different values, with the DP range of about 3 to about 30. For example, in an embodiment, DP is in a range of about 5 to about 25, or about 10 to about 20. The overall network structure is denoted by the infinity symbol (0). The linking group Y is one of the following moieties: —C(CF$_3$)$_2$—, —O—, —SO$_2$—, —C(=O)—, -(Ph)C(CF$_3$)—, —OPh-C(CF$_3$)$_2$—OPh-, —OPh-C(CH$_3$)$_2$—OPh-. In another embodiment, Y is —C(CF$_3$)$_2$.

In accordance with another embodiment, the crosslinked polyimides obtained with the multi-anhydride crosslinking agents may be defined by the following general chemical Formula (IX) below:

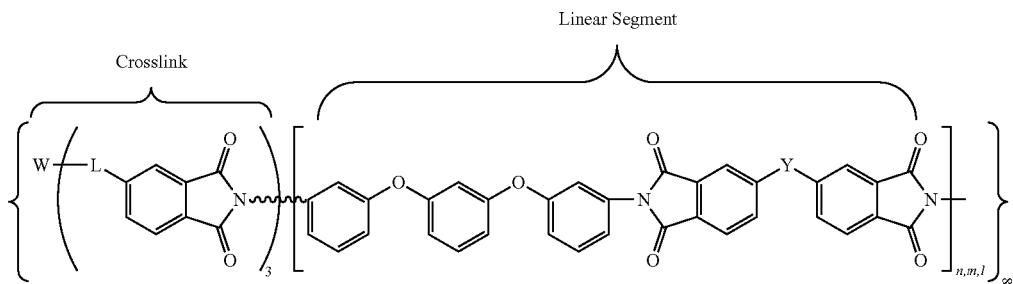

where W may be N or P=O; L, n, m, l, and Y are as defined above.

In accordance with yet another embodiment, the cross-linked polyimides obtained with the multi-anhydride cross-linking agents may be defined by the following general chemical Formula (X) below:

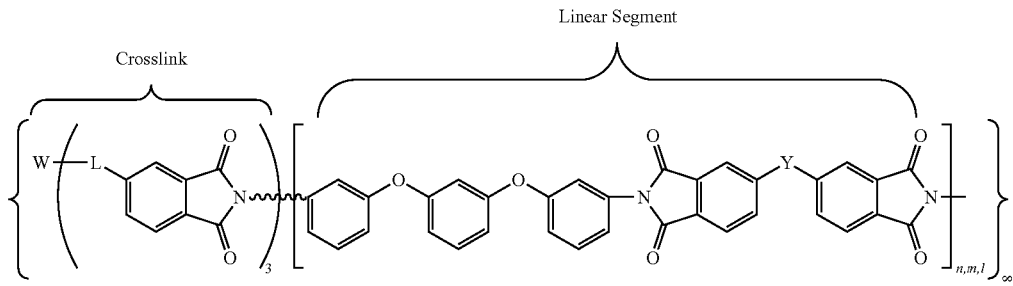

where W is N or benzene-1,3,5-trioxy (1,3,5-$C_6H_3O_3$); and n, m, l, and Y are as defined above.

Multi-Amine Crosslinking Agents:

In accordance with an embodiment of the present invention, a multifunctional crosslinking agent is provided that has three amine functional groups (i.e., tri-amine crosslinking agent). The tri-amine crosslinking agent may be defined by the general chemical Formula (IX): ($H_2N$—Ar—)$_3$—W, wherein Ar represents an aryl group that is directly or indirectly bonded to W; and wherein W may be $CH_3C$ (methylcarbyl); N (trivalent nitrogen); P=O (phosphine oxide); or $BO_3$ (borate). Accordingly, the tri-amine crosslinking agents may be ($H_2N$—Ar—)$_3$—$CCH_3$, ($H_2N$—Ar—)$_3$—N, ($H_2N$—Ar—)$_3$—P=O, or ($H_2N$—Ar—)$_3$—$BO_3$. In an embodiment, the Ar is a biaryl ether, and thus the tri-amine crosslinking agent may be further defined by the general Formula (X): ($H_2N$—Ar'—O—Ar"—)$_3$—W, where Ar' and Ar" may be similarly or differently substituted, and where the various isomers are further contemplated.

According to yet another embodiment, the tri-amine crosslinking agent is a tri(oxybenzene-amine) crosslinker having the following general Formula below (XI):

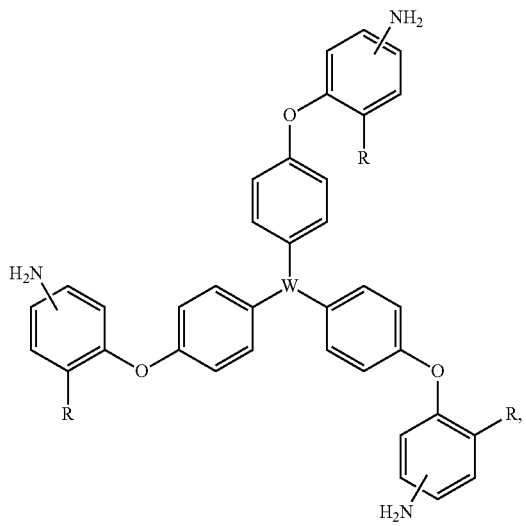

wherein W may be $CH_3C$ (methylcarbyl); N (trivalent nitrogen); P=O (phosphine oxide); or $BO_3$ (borate); R may be H, F, Cl, $CF_3$, or $CH_3$; and the amine groups (—$NH_2$) may be in the meta or para position with respect to oxygen of the biaryl ether bond. Exemplary tri(oxybenzene-amine) crosslinking agents 6a,b; 7a,b; 8a,b; and 9a,b are shown in Table 2 below.

TABLE 2
Exemplary Tri(oxybenzene-amine) Crosslinking Agents
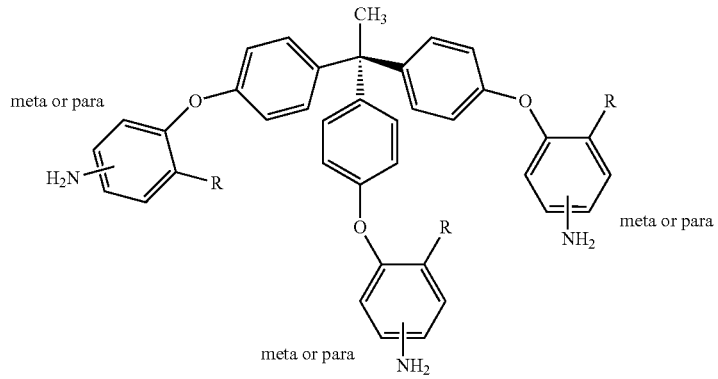
6a,b
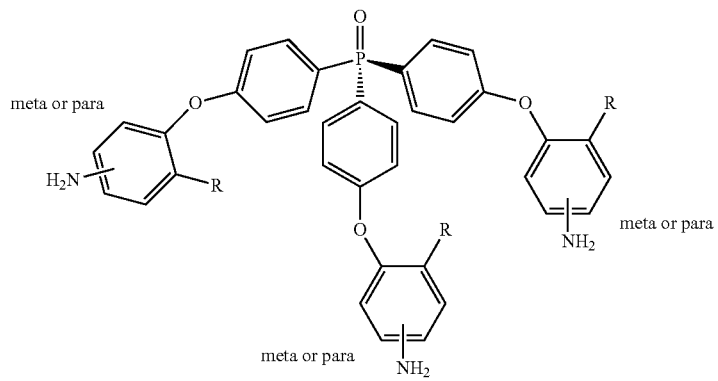
7a,b
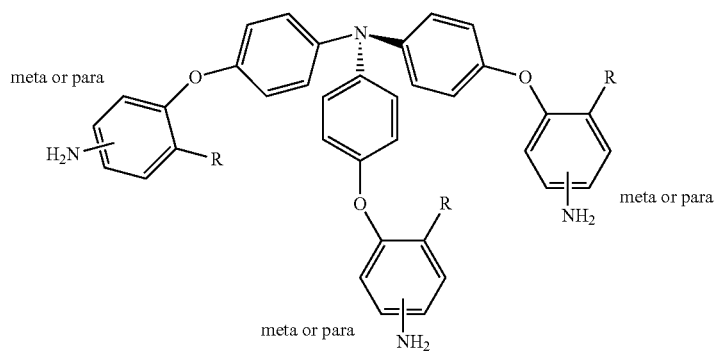
8a,b TABLE 2-continued Exemplary Tri(oxybenzene-amine) Crosslinking Agents

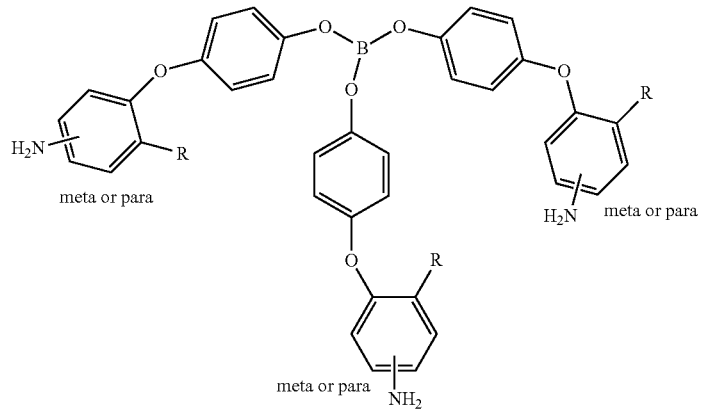

9a,b

Exemplary crosslinked aromatic polyimides obtained from the tri(oxybenzene-amine) crosslinking agents (where R=H) have the following general Formula (XII) below:

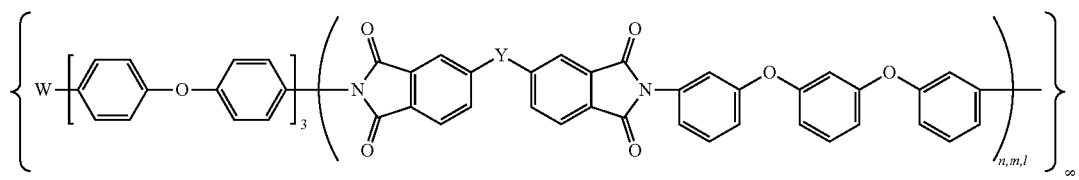

wherein Y is selected from the group consisting of —C(CF$_3$)$_2$—, —O—, —SO$_2$—, —C=O—, -(Ph)C(CF$_3$)—, —OPh-C(CH$_3$)$_2$-PhO—, —O(1,3-Ph)O— and —O(1,4-Ph)O—; n, m, and l are degrees of polymerization (DP) of each branch of the crosslinked aromatic polyimide; and the infinity symbol (∞) is used to denote an infinite network structure for a crosslinked polymer.

Similar to the crosslinked polymers obtained using the multi-anhydride crosslinking agents, the degrees of polymerization (DP) of each branch of the crosslinked aromatic polyimide may be the same or different. In one exemplary embodiment, the DPs are the same with respect to one another. In another embodiment, at least one of the DPs is different. In another embodiment, the DP of each branch may be in a range of about 3 to about 110 units. In an alternative embodiment, the DP may be in a range of about 3 to about 30, or about 5 to about 55 units. For example, in another embodiment, DP is in a range of about 5 to about 25, or about 10 to about 20.

The extent and amount of crosslinking in the crosslinked polyimide polymers and films may be altered by varying the concentration of the tri-amine crosslinker (i.e. about 0.5 mol %, about 1.0 mol %, about 2.0 mol %, or about 5.0 mol %). In one embodiment, the tri-amine crosslinker concentration may vary from about 0.3 mol % to about 10 mol %. In another embodiment, the tri-amine crosslinker concentration may be between about 0.5 mol % to about 5 mol %. The ability to vary the amount of crosslinking allows the synthesis of crosslinked polyimides with mechanical properties (i.e. Tg) tailored to a specific application or to specific environmental conditions.

Crosslinked Polymer Nanocomposites.

Current fabrication method of SMPI nanocomposites only enable the resulting nanocomposites to convert a 3D temporary shape to 2D permanent shape at high temperatures (>200° C.). Therefore, there is a dual need to impart SMPI nanocomposites with (a) the capability to convert a 2D temporary shape (for easy storage or packing at room temperature) to 3D permanent shape (which is the device shape at high temperature conditions) and (b) dimensional stability of 3D permanent shape of the SMPI nanocomposites.

Figure 1A:
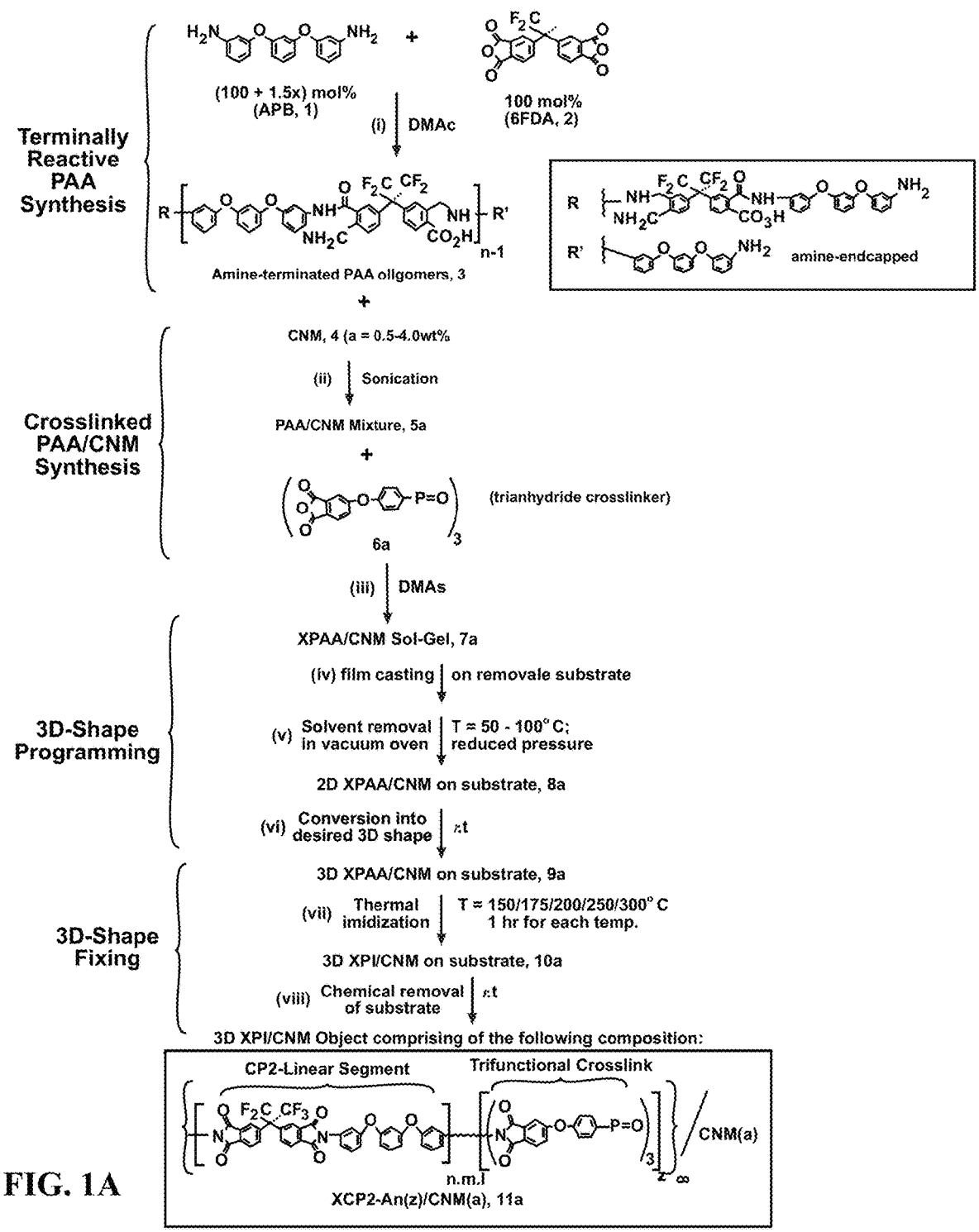
FIG. 1A is an exemplary scheme depicting the integrated process that combines the synthesis of lightly crosslinked polyamic acid (XPAA)/carbon nanomaterial (CNM) sol gel, steps (i)-(iii), and fabrication of 3D nanocomposite object (XPI/CNM) comprised of crosslinked polyimide (XPI) and a CNM: 2D (film) and 3D (origami object) fabrication, viz. steps (iv)-(v) and steps (vi)-(vii), respectively, and removal of supporting substrate, step (viii). This example pertains to generation of amine-terminated PAA that reacts fully with stoichiometric amount of a trianhydride crosslinker (POTAn). The idealized structure of crosslinked polyimides, designated as XCP2-An(z)/CMN(a), where (a)=wt % of CNM and (z)=mol % of phosphine-oxide trianhydride.
Figure 1B:
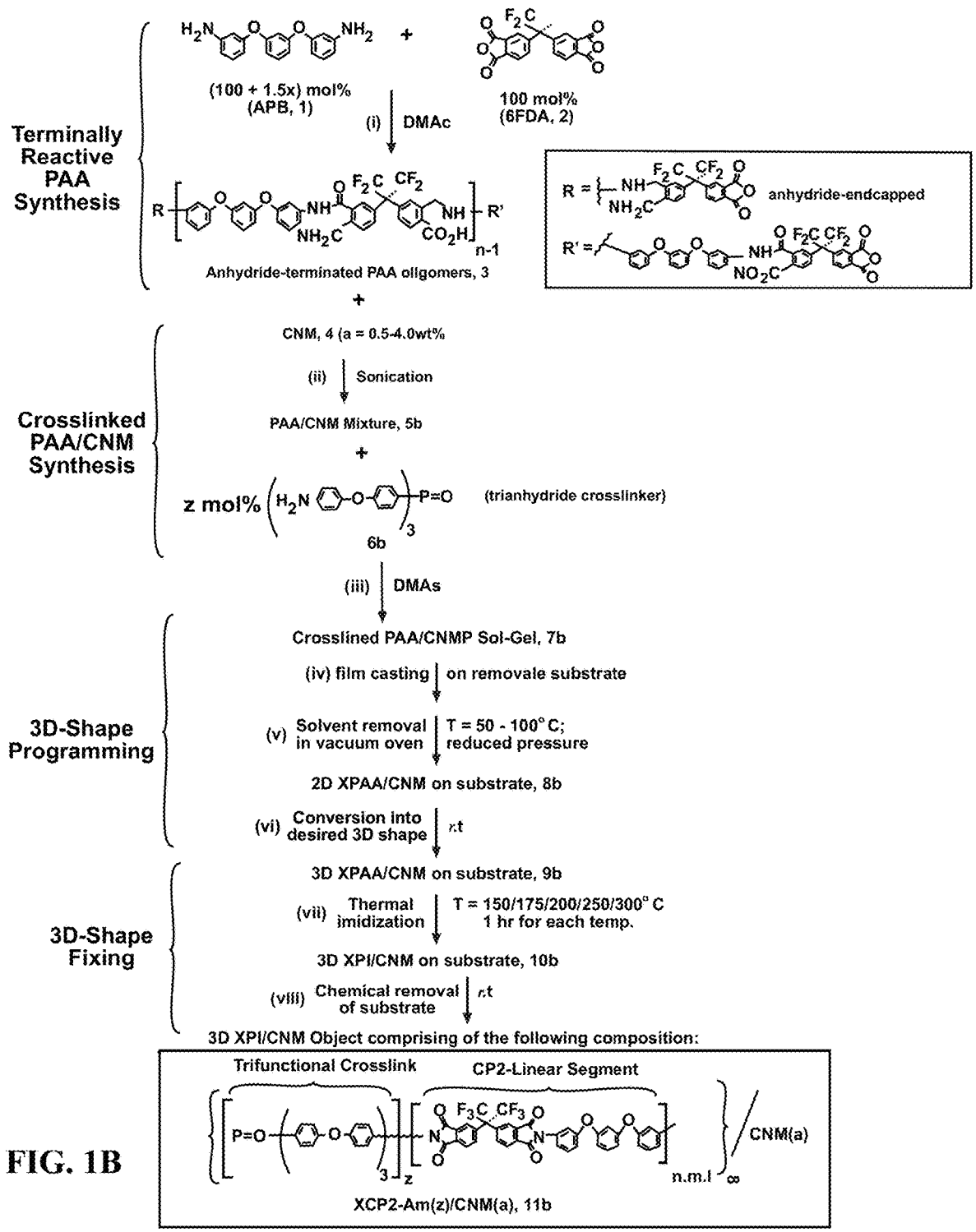
FIG. 1B is an exemplary scheme depicting the integrated process that combines the synthesis of lightly crosslinked polyamic acid (XPAA)/carbon nanomaterial (CNM) sol gel, steps (i)-(iii), and fabrication of 3D object comprised of crosslinked polyimide and a CNM (XPI/CNM): 2D (film) and 3D (origami object) fabrication, viz. steps (iv)-(v) and steps (vi)-(vii), respectively, and removal of supporting substrate, step (viii). This example pertains to generation of amine-terminated PAA that reacts fully with stoichiometric amount of a triamine crosslinker (POTAm). The idealized structure of crosslinked polyimides, designated as XCP2-Am(z)/CMN(a), where (a)=wt % of CNM and (z)=mol % of phosphine-oxide triamine.

Our origami-inspired fabrication process is based on the processing chemistry of poly(amic acid)/polyimide using either a triphenylphosphine-based triamine or a trianhydride as a crosslinker. In this process as depicted in FIG. 1A and FIG. 1B, when the trianhydride crosslinker (x mol %) is used (i.e. process A), the co-monomers, APB (a diamine, 1) and 6FDA (a dianhydride, 2) were dissolved under nitrogen atmosphere in a polar aprotic solvent such as N,N-dimethylacetamide (DMAc) (10-20 wt % polymer concentration) at room temperature for 24 h with excess APB (i.e. 1.5×mol % excess where x=mol % of trianhydride crosslinker used) for the preparation of poly(amic acid) oligomers (PAA oligomers, 3a) with reactive amine function as end groups. Then a carbon nanomaterial (CNM, 4; a=0.5-4 wt %) was added into the PAA solution, followed by sonication and/or high shearing to improve its dispersion. Subsequently, the trianhydride crosslinker (e.g. phosphine oxide trianhydride, 6a; z mol %) was added to the PAA/CNM mixtures (5) with a reaction stoichiometric ratio of the amino group to the terminal acid anhydride. After the crosslinker had completely dissolved, the resulting XPAA/CNM sol-gel (7a) was immediately used in the fabrication of origami object as described in the following paragraph. Alternatively in the process B, when a triamine crosslinker is used, anhydride-terminated PAA (6b) solution is generated from the initial polymerization mixture of excess dianhydride monomers and diamine monomer, followed by addition of the CNM and stoichiometrically balanced amount of the triamine crosslinker to result in the modified PAA/CNM sol-gel (7b) for immediate used in the fabrication of an origami object.

As depicted in FIGS. 1A, 1B, 2A, 2B, 3 and 4, the 3D object obtained after the integrated process that combines the synthesis of the modified PAA/CNM sol-gel and origami-inspired fabrication, is comprised of a phosphine oxide-triamine crosslinked polyimide/CNM nanocomposite materials, as represented by the following generic chemical Formula (Structure XIII) below, The origami objects possess the bi-stability of 2D & 3D geometries at room temperature, capability to recover the predetermined 3D shape at temperature near glass transition, and dimensional stability in 3D geometry at high temperatures (>200° C.) in the glass-rubbery transition region.

EXAMPLES

The following examples and methods are presented as illustrative of the present invention or methods of carrying out the invention, and are not restrictive or limiting of the scope of the invention in any manner.

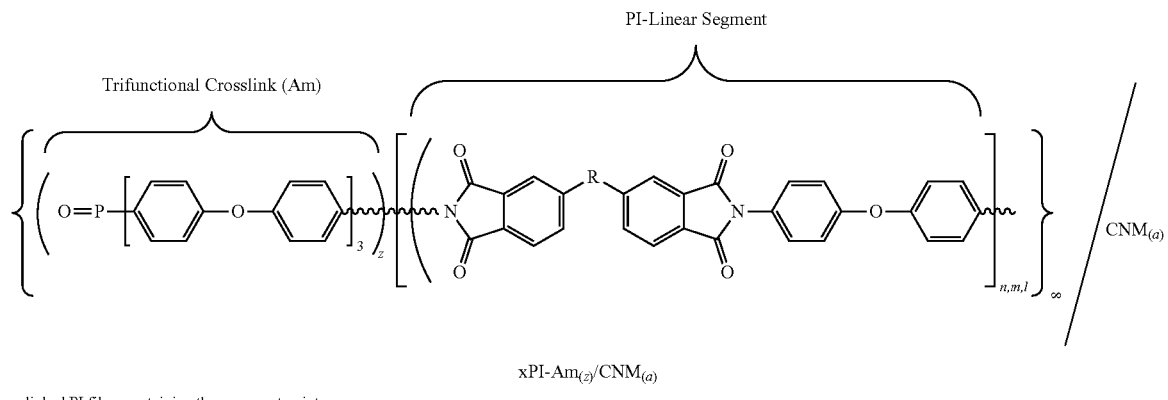

xPI-Am$_{(z)}$/CNM$_{(a)}$

Crosslinked PI films containing three-arm net points
n,m,l: DP of each arm;
z = mol % of crosslinker;
a = wt % of CNM or comprised of a phosphine oxide-trianhydride crosslinked polyimide/CNM nanocomposite materials, as represented by the following generic chemical formula (Structure XIV) below, Example 1

With reference to FIGS. 1A and 1B, exemplary integrated processing chemistry that is used to generate either tri-

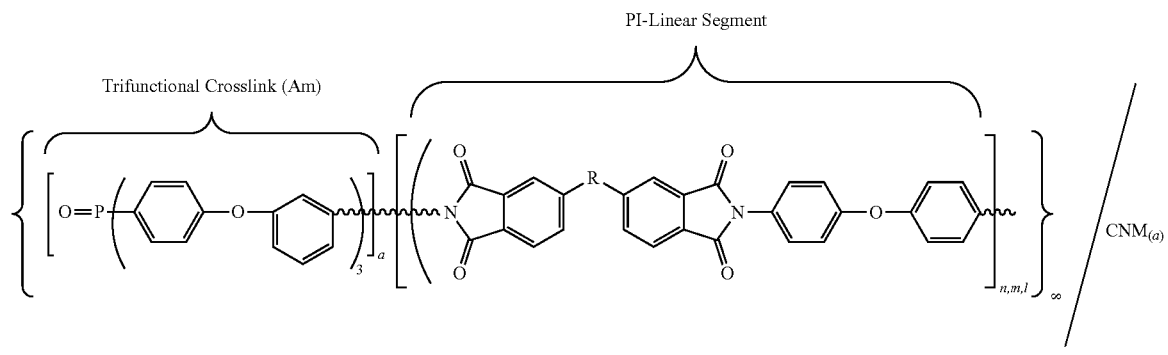

xPI-Am$_{(z)}$/CNM$_{(a)}$

Crosslinked PI films containing three-arm net points
n,m,l: DP of each arm;
a = wt % of CNM;
z = mol % of crosslinker Where R is a linking group including but not limited to $(CF_3)_2C$, O, —OPh-Me$_2$C-PhO— etc.; and CNM is a carbon nanomaterial including, SWNT, MWNT, CNF, graphene nanoplatelet (GNP) and graphene oxide (GO).

anhydride or tri-amine crosslinked polyimide nanocomposites and the resulting 2D objects from their respective reactive polyamic acid solution, a carbon nanomaterial (CNM), and a crosslinker, i.e either amine-terminated or anhydride-terminated PAA on a supporting 2D substrate (e.g. aluminum surface) are provided. CP2 (LaRC™-CP2, NASA Langley Research Center) is an exemplary fluorinated polyimide derived from 2,2-bis(4-phthalic anhydrido)-1,1,1,3,3,3-hexafluoroisopropane (6FDA) and 1,3-bis(3-aminophenoxy)benzene (APB). The subject polyimide (CP2) is selected to prove the concept because it is a well-known and well-characterized polyimide derived from 2,2-bis(4-phthalic anhydrido)-1,1,1,3,3,3-hexafluoroisopropane (6-FDA, a dianhydride monomer) and 1,3-bis(3-aminophenoxy)benzene (APB, a diamine monomer). Briefly, CP2 is a high-performance aerospace-grade polyimide that possesses remarkable properties including, high mechanical toughness, solvent resistance, high glass transition temperature, ultraviolet radiation resistance, low color, low solar absorption, and high thermal and thermo-oxidative stability. CP2 is particularly suitable for long-term survivability in space environments, and has been used to develop lightweight, inflatable structures that serve as Gossamer-like spacecraft, satellites, and solar energy collection/reflection systems. Addition of high-temperature shape-memory capability to CP2 and related polyimides will extend their applications where robust, dynamic properties are required under extremely hot conditions. Carbon nanomaterials (CNM) such as single-walled nanotube (SWNT), multi-walled nanotube (MWNT), graphene-like materials (GLM) from exfoliation of sulfuric-acid-intercalated graphite nanoplateles (GNP) are known to be dispersible well in solutions of polymers with high carboxylic acid content such as poly(amic acid) and poly(amide-amic acid) in N,N-dimethylacetamine (DMAC) or N-methylpyrrolidinone (NMP). Still referring to FIG. 1A, the origami-inspired fabrication process is based on the processing chemistry of poly(amic acid)/polyimide using either a triphenylphosphine-based trianhydride (4a) or triamine (4b) as a crosslinker. In this process, when the trianhydride crosslinker (x mol %) is used (i.e. process A), the co-monomers, APB (a diamine, 1) and 6FDA (a dianhydride, 2) were dissolved under nitrogen atmosphere in a polar aprotic solvent such as N,N-dimethylacetamide (DMAc) (5 wt % polymer concentration) at room temperature for 24 h with excess APB (i.e. 1.5×mol % excess where z=mol % of trianhydride crosslinker used) for the preparation of poly(amic acid) oligomers (PAA oligomers, 3a) with reactive amine function as end groups. A prescribed amount (0.5-4 wt % based on the theoretical wt. of the final crosslinked polyimide) of carbon nanomaterial (CNM, 4) was added to the PAA solution, and the resulting mixture was sonicated at room temperature. Subsequently, the trianhydride crosslinker (e.g. phosphine oxide trianhydride, 4a; z mol %) was added to the solution of PAA oligomers with a reaction stoichiometric ratio of the amino group to the terminal acid anhydride. After the crosslinker had completely dissolved, the resulting PAA/CNM sol-gel (5a) was immediately used in the fabrication of origami object as described in the following paragraph. Alternatively in the process B, when a triamine crosslinker is used, anhydride-terminated PAA (3b) solution is generated from the initial polymerization mixture of excess dianhydride monomers and diamine monomer, followed by sequential addition of a CNM and a stoichiometrically balanced amount of the triamine crosslinker to result in the modified PAA/CNM sol-gel (5b) for immediate used in the fabrication of an origami object as described in Example 5.

Example 2

Figure 2A:
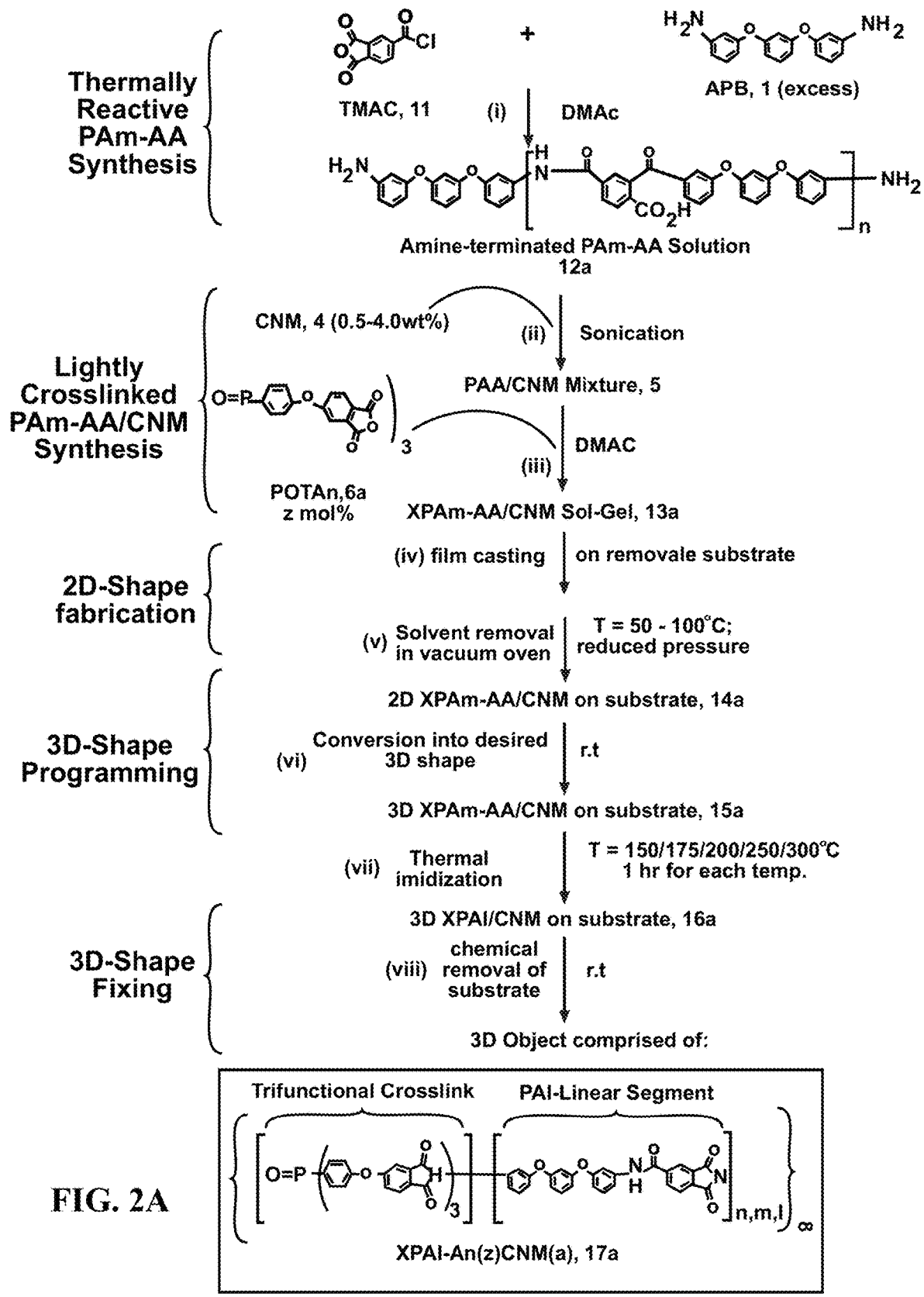
FIG. 2A is an exemplary scheme depicting the integrated process that combines the synthesis of a nanocomposite sol gel comprised of a lightly crosslinked poly(amide-amic acid) (PAm-AA) and a carbon nanomaterial (CNM), steps (i)-(iii), and fabrication of 3D object comprised of crosslinked poly(amide-imide) (XPAI) and a CNM and consisting of 2D (film) and 3D (origami object) fabrication, viz. steps (iv)-(v) and steps (vi)-(vii), respectively, and removal of supporting substrate, step (viii). This example pertains to generation of amine-terminated PAm-AA that reacts fully with stoichiometric amount of a trianhydride crosslinker (POTAn). The idealized structure of crosslinked polyimides, designated as XPAI-An(z)/CNM(a), where (a)=wt % of CNM and (z)=mol % of phosphine-oxide trianhydride, is shown in the box.
Figure 2B:
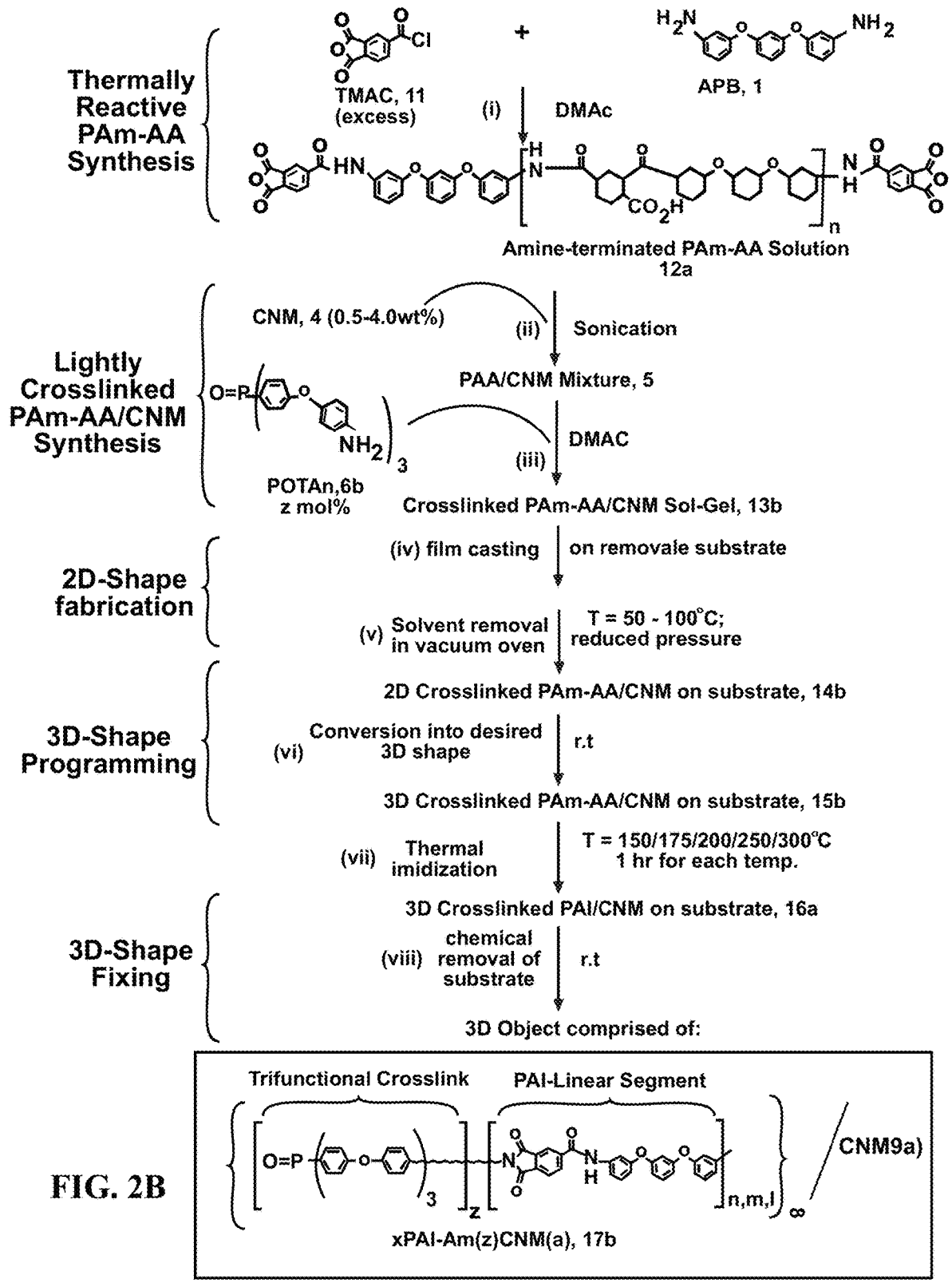
FIG. 2B is an exemplary scheme depicting the integrated process that combines the synthesis of a nanocomposite sol gel comprised of a lightly crosslinked poly(amide-amic acid) (PAm-AA) and a carbon nanomaterial (CNM), steps (i)-(iii), and fabrication of 3D object comprised of crosslinked poly(amide-imide) (XPAI) and a CNM and consisting of 2D (film) and 3D (origami object) fabrication, viz. steps (iv)-(v) and steps (vi)-(vii), respectively, and removal of supporting substrate, step (viii). This example pertains to generation of anhydride-terminated PAm-AA that reacts fully with stoichiometric amount of a triamine crosslinker (POTAm). The idealized structure of crosslinked polyimides, designated as XPAI-Am(z)/CNM(a), where (a)=wt % of CNM and (z)=mol % of phosphine-oxide triamine, is shown in the box.

FIGS. 2A and 2B illustrate the origami-inspired fabrication process that is based on the processing chemistry of poly(amide-amic acid)/poly(amide-imide) (Pam-AA/PAI) using either a triphenylphosphine-based trianhydride (6a) or triamine (6b) as a crosslinker, respectively. When the trianhydride crosslinker (z mol %) is used (i.e. process A'), the co-monomers, APB (a diamine, 1) and TMAC (trimellitic anhydride-chloride (an anhydride-acid-chloride monomer, 11) were dissolved under nitrogen atmosphere in a polar aprotic solvent such as N,N-dimethylacetamide (DMAc) (5 wt % polymer concentration) at room temperature for 24 h with excess APB (i.e. 1.5×mol % excess where z=mol % of trianhydride crosslinker used) for the preparation of oligo (amide-amic acid) (PAm-AA oligomers, 12a) with reactive amine function as end groups. Subsequently, the trianhydride crosslinker (e.g. phosphine oxide trianhydride, 5a; x mol %) was added to the solution of PAm-AA oligomers with a reaction stoichiometric ratio of the amino group to the terminal acid anhydride. After the crosslinker had completely dissolved, the resulting PAm-AA sol-gel (13a) was immediately used in the fabrication of origami (3D) object as described in Example 5. Alternatively in the process B' as depicted in FIG. 2B, when a triamine crosslinker (5b) is used, anhydride-terminated PAm-AA (12b) solution is generated from the initial polymerization mixture of excess anhydride-acid chloride monomer (TMAC) and the two diamine monomers, followed by addition of stoichiometrically balanced amount of the triamine crosslinker to result in the modified PAm-AA sol-gel (13b) for immediate used in the fabrication of an origami object as described in Example 5.

Example 4

FIG. 3 illustrates the origami-inspired fabrication process for the crosslinked copolymer compositions of a polyimide and a poly(amide-imide) that are derived from blending of poly(amide-amic acid)/poly(amide-imide) (PAm-AA/PAI) using either a triphenylphosphine-based trianhydride (5a) or triamine (5b) as a crosslinker, respectively. When the trianhydride crosslinker (x mol %) is used (i.e. process A"), the amine-terminated PAA solution (4a) from Example 1 (FIG. 1A) and the amine-terminated PAm-AA solution (12a) from Example 2 (FIG. 2A) are blended, followed by the addition of appropriate amount of the trianhydride crosslinkers (2z mol % based on the stoichiometry depicted in FIGS. 1A and 2A). After the crosslinker had completely dissolved, the resulting blended PAA/PAm-AA sol-gel (18a) was immediately used in the fabrication of origami (3D) object as described in Example 4. Alternatively in the process B", when a triamine crosslinker (5b) is used, anhydride-terminated PAA solution (4b) from Example 1 (FIG. 2B) and PAm-AA (12b) solution from Example 2 (FIG. 2B) are mixed, followed by addition of stoichiometrically balanced amount of the triamine crosslinker to result in the modified PAA/PAm-AA sol-gel (18b) for immediate used in the fabrication of an origami object as described in Example 5.

Example 5

Referring to FIG. 5, a flow chart for constructing a hollow shape memory polyimide/CNM cube is provided. The first step of the fabrication is to prepare the modified XPAA/CMN dispersion and (sol-gel) containing the requisite amount of an appropriate crosslinker as described above and shown in FIGS. 1A, 1B, 2A, 2B and 3. The second step entails pouring the viscous XPAA/CNM sol-gel into a substrate (e.g. an aluminum dish). The third step pertains to evaporation of the solvent under reduced pressure and in temperature range where none or partial curing of PAA is taking place. For example, the substrate coated with the viscous modified PAA solution may be heated to a temperature from about 50° C. to about 100° C. under reduced pressure, such that only partial curing of PAA is taking place. However use of lower temperatures (e.g., room temperature to about 50° C.) and lower pressures (e.g., less than about 200 torr or less than about 100 torr) may minimize or prevent excessive curing. Once the laminated substrate is stable, the next step involves drawing the origami folding pattern on the aluminum side of the substrate and cut out the pattern with a pair of scissors. Manual folding sequence of the two-dimensional configuration of the origami object at room temperature is then performed so that the aluminum substrate is on the outside to form a three-dimensional form. Following an imidization process, where a curing schedule for crosslinked polyimides is performed (e.g., sequential heating at about 150° C., about 175° C., about 200° C., about 250° C., and/or about 300° C.), the next step involves removal of the substrate. For example aluminum can be dissolved easily in aqueous HCl. The resulting crosslinked polyimide/CNM hollow cube is shown in the top photo of FIG. 4B. Still referring to FIG. 4B, this crosslinked polyimide nanocomposite cube can be unfolded manually into the corresponding planar "cross" structure in an oil bath at about 215° C. Stable indefinitely at room temperature, the temporary "cross" structure spontaneously (approximately less than about 20 seconds) folds into the cube upon immersion in (by dropping into) the same hot oil bath. The PI cube showed no visible shape distortion after 3 days at 215° C., and regained its initial modulus (~2-3.2 GPa by dynamic mechanical analysis) after taken out of the oil bath.

Example 6

As depicted in FIG. 5(a), to show various kind of CNM that can be used, three more origami objects have been similarly fabricated, namely a square-based pyramid, a "paper plane" and a twist using the following crosslinked polyimide/CNM nanocomposites, in which CNM is selected from SWNT, graphene oxide (GO) and graphene nanoplatelete (GNP) in 0.1-4 wt %: XCP2-An2/SWNT0.5, XCP2-An2/SWNT1, XCP2-An2/SWNT4, XCP2-An2/GO0.4 and XCP2-An2/GNP2.1. FIGS. 5(a)-5(c) are to demonstrate the generality of the shape-recovery process for the origami objects in FIG. 5(a).

Example 7

Referring to FIG. 6, although the Tg's of the resulting composites do not show much change by the addition of carbon nanomaterials, their moduli increase substantially with CNM concentration (see also Table 3 as Example 8). The moduli of linear CP2 and 2 mol % crosslinked XCP2-An2 polyimides are 1.90 and 2.54 GPa, respectively. Introducing the crosslinking points by the trianhydride alone drives the modulus up to 0.64 GPa. Addition of CNPs results in even higher modulus, for example, modulus increases from 2.54 to 3.12 GPa for XCP2-An2/GNP2.

Example 8

TABLE 3

Composition and properties of polyimide/NP films (XCP2-AN2 derivatives)

| Sample | 6FDA (mol %) | APB (mol %) | Trianhydride (mol %) | CNM Type | CNM (Wt %) | $T_g^a$ (° C.) | $E^b$ (GPa) | $T_{d5\%}^c$ (° C.) in air |
|---|---|---|---|---|---|---|---|---|
| Linear CP2 | 100 | 100 | 0 | NA | 0 | 219 | 1.90 ± 0.15 | 526 |
| xCP2-An2 | 97 | 100 | 2 | NA | 0 | 222 | 2.54 ± 0.19 | 518 |
| xCP2-An2/SWNT0.5 | 97 | 100 | 2 | SWNT | 0.5 | 220 | 2.62 ± 0.43 | 520 |
| xCP2-An2/SWNT1 | 97 | 100 | 2 | SWNT | 1 | 221 | 2.78 ± 0.34 | 522 |
| xCP2-An2/SWNT4 | 97 | 100 | 2 | SWNT | 4 | 221 | 3.06 ± 0.28 | 524 |
| xCP2-An2/GO4 | 97 | 100 | 2 | GO | 4 | 220 | 3.12 ± 0.56 | 527 |
| xCP2-An2/mGNP2 | 97 | 100 | 2 | GNP | 2 | 224 | 2.81 ± 0.32 | 523 |

Notes:
[a]Glass transition temperature measured from the peak of tanδ (DMA) as an average value taken from 5 measurements;
[b]modulus determined in tension at 25° C. as average from 5 specimens per sample;
[c]Temperature at which 5% weight loss as recorded on TGA thermogram obtained with a heating rate of 10° C./min.

Example 9

Additionally, as shown in FIG. 7, dynamic mechanical analysis of linear CP2 and various crosslinked CP2 films was used to compare their moduli and relative dimensional stability on the glass-transition plateau, which shows the dramatic increase in storage modulus imparted by crosslinking with the multi-functional crosslinking agents. Repeatability of the shape recovery process was determined via cyclic DMA recovery experiments at constant heating/cooling rates. A force was applied at 270° C. that allowed the sample to stretch to 24% strain at which point the sample was equilibrated at 270° C. The sample was then cooled to 80° C., the stress released and then heated to recover the shape at 270° C. FIGS. 7(a) and (b) depicts, respectively, the three-dimensional and two-dimensional shape memory behaviors of XCP2-An2/SWNT0.5 containing 2 mol % trianhydride crosslinker and 0.5 wt % SWNT, where the glass transition temperature was used as the triggering temperature. Both shape memory fixity ($R_f$) and recovery ($R_r$) of XCP2-An2/SWNT0.5 were also calculated based on the above tests. Shape fixity of 100% implies a perfect retention of the programmed strain after the external stress has been released, and reflects the efficacy of the first two steps of the shape memory process. However, since films shrink during cooling associated with the shape-fixing process, $R_r$ values are always less than 100%. Shape recovery of 100% implies perfect recovery of the permanent shape after the shape memory cycle. The films were subjected to 11 testing cycles. The results attest to the superior shape memory properties and repeatability. Shape fixity is 95.2-95.4% and shape recovery is almost 100% in each cycle except first cycle (97.5%). As depicted in FIG. 7, the shape memory testing of XCP2-AN2/SWNT1 film containing 1 wt % of SWNT shows much better results, after 32 testing cycles, with a strain of 23.6% between 180 and 240° C. The shape fixity is around 99% and the shape recovery is almost 100%. The 100% shape recovery is an improvement compared with the previous neat XCP2 films, which exhibit about 98% shape recovery.

Example 10

Referring to FIGS. 8 and 9, DMA tests of GO and GNP-containing xCP2 show similar excellent shape memory results. However, the strain of XCP2-An2/GO4 gradually deteriorates from 15.7% in Cycle 1 to 13.3% in Cycle 12 probably due to crosslinking reaction between polyimide and the hydroxyl group on the graphene oxide. As the crosslinking density increases, the elongation is reduced accordingly. A consequence of this increasing in modulus and glass transition would be shifting the shape-memory triggering temperature higher.

Example 11—Representative Procedure for the Synthesis of Triamine-Crosslinked Polyimides (2 Mol % Triamine, Denoted as XCP2-Am2)

1,3-Bis(3-aminophenoxy)benzene (APB, 1.134 g, 3.880 mmol) and N,N-dimethyl acetamide (DMAc, 15 mL) were added to a 50 mL-3-necked flask equipped with a magnetic stirrer, nitrogen inlet and outlet, and the resulting mixture was stirred under dry nitrogen at room temperature for 30 min. 1,1,1,3,3,3-hexafluoro-2,2-bis(4-phthalic anhydrido) propane (6FDA, 1.777, 4.000 mmol) was then added. The light yellow solution was agitated at room temperature for 24 hr to afford a poly(amic acid) solution. Then, tris(4-aminophenyl)phosphine oxide (0.048 g, 0.080 mmol) was added to the solution. After the triamine was totally dissolved in DMAc, the mixture poured into a glass dish, followed by vacuum evaporation of DMAc at 50° C., and continuous heating in the vacuum-oven at: 100° C./1 h, 150° C./1 h, 175° C./1 h, 200° C./1 h, 250° C./1 h and 300° C./1 h to form crosslinked polyimide films. The film thickness was approximately 20-100 μm. ATR-IR (cm-1): 3076, 1784, 1720, 1586, 1478, 1449, 1368, 1298, 1239, 1189, 1098, 1003, 846, 811, 799, 718, 681, 627, 568. This procedure was followed to prepare other xCP2-Ama (subscript "a" stands for percentage of triamine crosslinker).

Example 12—Representative Procedure for the Synthesis of Trianhydride-Crosslinked Polyimides (2 Mol % Trianhydride, XCP2-An2)

APB (1.169 g, 4.000 mmol) and DMAc (15 mL) were added to a 50 mL 3-necked flask equipped with a magnetic stirrer, nitrogen inlet and outlet, and stirred under dry nitrogen at room temperature for 30 min. 6FDA (1.724, 3.880 mmol) was then charged. The light yellow solution was agitated at room temperature for 24 hr to afford a poly(amic acid) solution. Then tris(4-phthalic anhydride) phosphine oxide (0.0612 g, 0.080 mmol) was added to this solution. After the trianhydride was totally dissolved in DMAc, the mixture poured into a glass dish, followed by vacuum evaporation of DMAc at 50° C., and heat-treated at: 100° C./1 h, 150° C./1 h, 175° C./1 h, 200° C./1 h, 250° C./1 h and 300° C./1 h to form crosslinked polyimide films. The film thickness was approximately 50-100 μm. This procedure was followed to prepare other XCP2-Ana (subscript "a" stands for mol. percentage of trianhydride crosslinker).

Example 13—Representative Procedure for the Synthesis of Trianhydride-Crosslinked Polyimide/SWNT Composites (2 Mol % Trianhydride, 0.5 wt % SWNT, XCP2-An2/SWNT0.5)

APB (1.169 g, 4.000 mmol) and DMAc (15 mL) were added to a 50 mL 3-necked flask equipped with a magnetic stirrer, nitrogen inlet and outlet, and stirred under dry nitrogen at room temperature for 30 min. 6FDA (1.724, 3.880 mmol) was then charged. The light yellow solution was agitated at room temperature for 24 hr to afford a poly(amic acid) solution. Then, SWNT (0.0141 g, 0.5 wt %) was added followed by sonication and high shear. Tris(4-phthalic anhydride)phosphine oxide (0.0612 g, 0.080 mmol) was added to this black mixture. After the trianhydride was totally dissolved, the mixture poured into a glass dish, followed by vacuum evaporation of DMAc at 50° C., and heat-treated at: 100° C./1 h, 150° C./1 h, 175° C./1 h, 200° C./1 h, 250° C./1 h and 300° C./1 h to form crosslinked polyimide films. The film thickness was approximately 50-100 μm. This procedure was followed to prepare other XCP2-An2/SWNTb (subscript "b" stands for weight percentage of SWNT).

Example 14—Representative Procedure for the Synthesis of Trianhydride-Crosslinked Polyimide/GO Composites (2 Mol % Trianhydride, 4 wt % GO, XCP2-An2/GO4)

APB (1.169 g, 4.000 mmol) and DMAc (15 mL) were added to a 50 mL 3-necked flask equipped with a magnetic stirrer, nitrogen inlet and outlet, and stirred under dry nitrogen at room temperature for 30 min. 6FDA (1.724, 3.880 mmol) was then charged. The light yellow solution was agitated at room temperature for 24 hr to afford a poly(amic acid) solution. Then GO (0.0564 g, 4.0 wt %) was added followed by sonication and high shear. The trianhydride (0.0612 g, 0.080 mmol) was added to this black mixture. After the trianhydride was totally dissolved, the mixture poured into a glass dish, followed by vacuum evaporation of DMAc at 50° C., and heat-treated at: 100° C./1 h, 150° C./1 h, 175° C./1 h, 200° C./1 h, 250° C./1 h and 300° C./1 h to form crosslinked polyimide films. The film thickness was approximately 20-100 μm.

Example 15—Synthesis of GNP-NH$_2$

Asbury graphite nanoplatelet 1721 (GNP 1721, 10 g) was placed on the bottom of 400 mL beaker and heated rapidly in a microwave oven at 1000 Watt for 30 sec. The GNP volume was expanded over 100 times. The resulting product is designed as mGNP and was used directly without purification for next step reaction. Into a 250 mL resin flask equipped with a high torque mechanical stirrer, and nitrogen inlet and outlet, 3-aminophenoxy-4-benzoic acid (0.50 g, 2.18 mmol) and mGNP (0.50 g), PPA (83% $P_2O_5$ assay, 20 g) and phosphorus pentoxide ($P_2O_5$, 5.0 g) were charged and stirred with dried nitrogen purging at 130° C. for 72 h. After cooling down to room temperature water was added. The resulting precipitate was collected, washed with diluted ammonium hydroxide and Soxhlet extracted with water for three days and methanol for three days. It was then dried over $P_2O_5$ under reduced pressure at 72 h 100° C. for 72 h to afford 0.80 g (83% yield) of dark brown solid. FT-IR (KBr, cm-1): 3434, 1627 (carbonyl), 1597, 1491, 1228, 1163. There are 3.3 3-aminophenoxy-4-benzoyl groups attached every 1000 carbon based on TGA results. The resulting amine-functionalized GNP is designated as GNP-$NH_2$.

Example 16—Representative Procedure for the Synthesis of Trianhydride-Crosslinked Polyimide/GNP Composites (2 Mol % Trianhydride, 2 wt % GNP, xCP2-An2/GNP2)

APB (1.169 g, 4.000 mmol) and DMAc (15 mL) were added to a 50 mL 3-necked flask equipped with a magnetic stirrer, nitrogen inlet and outlet, and stirred under dry nitrogen at room temperature for 30 min. 6FDA (1.724, 3.880 mmol) was then charged. The light yellow solution was agitated at room temperature for 24 hr to afford a poly(amic acid) solution. Then GNP-$NH_2$ (0.0282 g, 2.0 wt %) was added followed by sonication and high shear. The trianhydride (0.0612 g, 0.080 mmol) was added to this black mixture. After the triamine had totally dissolved, the mixture poured into a glass dish, followed by vacuum evaporation of DMAc at 50° C., and heat-treated at: 100° C./1 h, 150° C./1 h, 175° C./1 h, 200° C./1 h, 250° C./1 h and 300° C./1 h to form crosslinked polyimide films. The film thickness was approximately 50-100 μm.

Example 17—Representative Procedure of Fabrication of Polyimide/NP Complexed Shapes (XCP2-An2/SWNT0.5 Cube)

APB (1.169 g, 4.000 mmol) and DMAc (15 mL) were added to a 50 mL 3-necked flask equipped with a magnetic stirrer, nitrogen inlet and outlet, and stirred under dry nitrogen at room temperature for 30 min. 6FDA (1.724, 3.880 mmol) was then charged. The light yellow solution was agitated at room temperature for 24 hr to afford a poly(amic acid) solution. Then SWNT (0.0141 g, 0.5 wt %) was added followed by sonication and high shear. The phosphine oxide trianhydride crosslinker (0.0612 g, 0.080 mmol) was added to this solution. After the trianhydride was totally dissolved in DMAc, the resulting PAA solution was poured into a circular aluminum dish, followed by vacuum evaporation of most DMAc at 50° C. An origami folding pattern on the aluminum side of the substrate was drawn and cut out the pattern with a pair of scissors or punched out the pattern from a mold. The XCP2/SWNT preform on the aluminum was manually folded from the 2D configuration to a 3D cube at 50-100° C. so that the aluminum substrate is on the outside. The PAA/SWNT cube was further heat-treated at: 150° C./1 h, 175° C./1 h, 200° C./1 h, 250° C./1 h and 300° C./1 h to form a crosslinked polyimide/SWNT cube. After cooling to room temperature, the aluminum substrate was removed by immersing the box into a dilute HCl solution for 2-3 h.

Example 18—Shape Memory Properties of xCP2-An2/SWNT0.5

A rectangular film (8×4×0.1 mm) was mounted onto the DMA clamps. Shape recovery process was determined via cyclic DMA experiments at constant heating/cooling rates. A force was applied at 270° C. that allowed the sample to stretch to 24% strain at which point the sample was equilibrated at 270° C. The sample was then cooled to 80° C., the stress released and then heated to recover the shape at 270° C. Both shape fixity and shape recovery were calculated based on the equation in the footnote to Table 4. A Total of 11 cycles were run and results are tabulated below.

TABLE 4

Shape memory fixity and recovery of XCP2-An2/SWNT0.5

| Cycle No. | Shape Memory Fixity,[a] $R_f$ % | Shape Memory Recovery,[b] $R_r$ % |
|---|---|---|
| 1 | 95.2 | 99.8 |
| 2 | 95.3 | 99.8 |
| 3 | 95.2 | 99.9 |
| 4 | 95.2 | 99.9 |
| 5 | 95.3 | 99.9 |
| 6 | 95.4 | 99.9 |
| 7 | 95.2 | 99.9 |
| 8 | 95.2 | 99.9 |
| 9 | 95.3 | 99.8 |
| 10 | 95.3 | 99.9 |
| 11 | 95.2 | 99.9 |

[a]The shape fixity of the Nth cycle, $R_f(N) = [\varepsilon_{u,(N)}/\varepsilon_{m,(N)}] \times 100\%$ is defined as the ratio between this "programming" deformation at $T > T_g$ and the deformation remaining upon removal of the constraint at $T < T_g$ (i.e. a stress free state). Here $\varepsilon_u$ is the strain after removal of the tensile stress and $\varepsilon_m$ is the maximum applied strain in the programming step.
[b]The shape recovery of the Nth cycle, $R_r(N) = [\varepsilon_{u,(N)} - \varepsilon_{p,(N)}]/[\varepsilon_{u,(N)} - \varepsilon_{p,(N-1)}] \times 100\%$, quantifies how well the permanent shape has been memorized. Here, $\varepsilon_p$ is the residual strain after the stress has been removed from the sample in the recovery cycle.

Example 19—Shape Memory Properties of XCP2-An2/GO4

A rectangular film (8×4×0.1 mm) was mounted onto the DMA clamps. Shape recovery process was determined via cyclic DMA experiments at constant heating/cooling rates. A force was applied at 300° C. that allowed the sample to stretch to 35% strain at which point the sample was equilibrated at 300° C. The sample was then cooled to 180° C., the stress released and then heated to recover the shape at 280° C. Both shape fixity and shape recovery were calculated based on the equation in the Table 3. Total 21 cycles were run and results are listed below.

TABLE 5

Shape memory fixity and recovery of XCP2-An2/GO4

| Cycle No. | Shape Memory Fixity,[a] $R_f$ % | Shape Memory Recovery,[b] $R_r$ % |
|---|---|---|
| 1 | 95.2 | 97.5 |
| 2 | 95.3 | 99.8 |
| 3 | 95.2 | 99.9 |
| 4 | 95.2 | 99.9 |
| 5 | 95.3 | 99.9 |
| 6 | 95.4 | 99.9 |
| 7 | 95.2 | 99.9 |

TABLE 5-continued

Shape memory fixity and recovery of XCP2-An2/GO4

| Cycle No. | Shape Memory Fixity,[a] $R_f$ % | Shape Memory Recovery,[b] $R_r$ % |
|---|---|---|
| 8 | 95.2 | 99.9 |
| 9 | 95.3 | 99.8 |
| 10 | 95.3 | 99.9 |
| 11 | 95.2 | 99.9 |

[a]The shape fixity of the Nth cycle, $R_f(N) = [\varepsilon_{u,(N)}/\varepsilon_{m,(N)}] \times 100\%$ is defined as the ratio between this "programming" deformation at $T > T_g$ and the deformation remaining upon removal of the constraint at $T < T_g$ (i.e. a stress free state). Here $\varepsilon u$ is the strain after removal of the tensile stress and $\varepsilon m$ is the maximum applied strain in the programming step.
[b]The shape recovery of the Nth cycle, $R_r(N) = [\varepsilon_{u,(N)} - \varepsilon_{p,(N)}]/[\varepsilon_{u,(N)} - \varepsilon_{p,(N-1)}] \times 100\%$, quantifies how well the permanent shape has been memorized. Here, $\varepsilon p$ is the residual strain after the stress has been removed from the sample in the recovery cycle.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A shape memory composite film comprising:
    a) a polymer selected from the group consisting of a trianhydride crosslinked polyimide, a trianhydride crosslinked poly(amide-imide), a trianhydride crosslinked polyimide poly(amide-imide) copolymer and mixtures thereof; and
    b) a carbon based nano-material.

2. The shape memory composite film of claim 1 wherein said carbon based nano-material is selected from the group consisting of carbon nanotubes, carbon nanofibers, graphene oxide, graphite nanoplatelets.

3. The shape memory composite film of claim 1 wherein said carbon based nano-material has a maximum dimension of from about 100 nanometers to 1 nanometer.

4. The shape memory composite film of claim 1 wherein the weight ratio polymer to carbon based nano-material is from about 99.9:0.1 to about 50:50.

5. The shape memory composite film of claim 1 wherein the weight ratio polymer to carbon based nano-material is from 99.9:0.1 to about 90:10.

6. The shape memory composite film of claim 1 wherein the weight ratio polymer to carbon based nano-material is from about 99:1 to about 95:5.

\* \* \* \* \*